(12) United States Patent
Shinohara

(10) Patent No.: US 10,318,792 B2
(45) Date of Patent: Jun. 11, 2019

(54) TARGET PICKUP DEVICE AND TARGET DETECTION METHOD

(71) Applicant: Panasonic Intellectual Property Management Co., Ltd., Osaka (JP)

(72) Inventor: Toshiaki Shinohara, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 164 days.

(21) Appl. No.: 15/302,104

(22) PCT Filed: Mar. 3, 2015

(86) PCT No.: PCT/JP2015/001094
§ 371 (c)(1),
(2) Date: Oct. 5, 2016

(87) PCT Pub. No.: WO2015/155926
PCT Pub. Date: Oct. 15, 2015

(65) Prior Publication Data
US 2017/0116464 A1 Apr. 27, 2017

(30) Foreign Application Priority Data
Apr. 8, 2014 (JP) ................................. 2014-079410

(51) Int. Cl.
*G06K 9/00* (2006.01)
*H04N 5/232* (2006.01)
(Continued)

(52) U.S. Cl.
CPC ..... *G06K 9/00228* (2013.01); *H04N 5/23219* (2013.01); *G06K 9/00261* (2013.01);
(Continued)

(58) Field of Classification Search
None
See application file for complete search history.

(56) References Cited

U.S. PATENT DOCUMENTS

2010/0008548 A1* 1/2010 Matsuoka .......... G06K 9/00228
382/118
2011/0181746 A1* 7/2011 Free ................... G06K 9/00234
348/222.1
(Continued)

FOREIGN PATENT DOCUMENTS

JP 07-073298 A 3/1995
JP 2006-146413 A 6/2006
(Continued)

OTHER PUBLICATIONS

International Search Report dated Jun. 2, 2015, for corresponding International Application No. PCT/JP2015/001094, 4 pages.

*Primary Examiner* — Justin P. Misleh
(74) *Attorney, Agent, or Firm* — Seed IP Law Group LLP

(57) ABSTRACT

An image pickup device of the present invention includes an image pickup unit that captures a video image, a mask area determination unit that determines a mask area, for which processing for detection of a characteristic part of a target is excluded, among a portion or the entirety of an area of image data of the video image captured by the image pickup unit, and a characteristic part detector that performs the detection processing of the characteristic part of the target on a detection target area obtained by excluding the mask area determined by the mask area determination unit from the portion or the entirety of the area of the image data of the video image captured by the image pickup unit.

12 Claims, 18 Drawing Sheets

(51) Int. Cl.
*G06T 1/00* (2006.01)
*G06K 9/32* (2006.01)

(52) U.S. Cl.
CPC ....... *G06K 9/00791* (2013.01); *G06K 9/3241* (2013.01); *G06T 1/00* (2013.01); *H04N 5/232* (2013.01)

(56) References Cited

U.S. PATENT DOCUMENTS

| | | | | |
|---|---|---|---|---|
| 2011/0182503 A1* | 7/2011 | Free | ................... | G06K 9/00234 382/162 |
| 2011/0182507 A1* | 7/2011 | Free | ................... | G06K 9/00234 382/164 |
| 2011/0182509 A1* | 7/2011 | Free | ................... | G06K 9/00234 382/165 |
| 2014/0341442 A1* | 11/2014 | Lewis | ................ | G06K 9/00248 382/118 |

FOREIGN PATENT DOCUMENTS

| | | |
|---|---|---|
| JP | 2008-211534 A | 9/2008 |
| JP | 2012-014535 A | 1/2012 |

\* cited by examiner

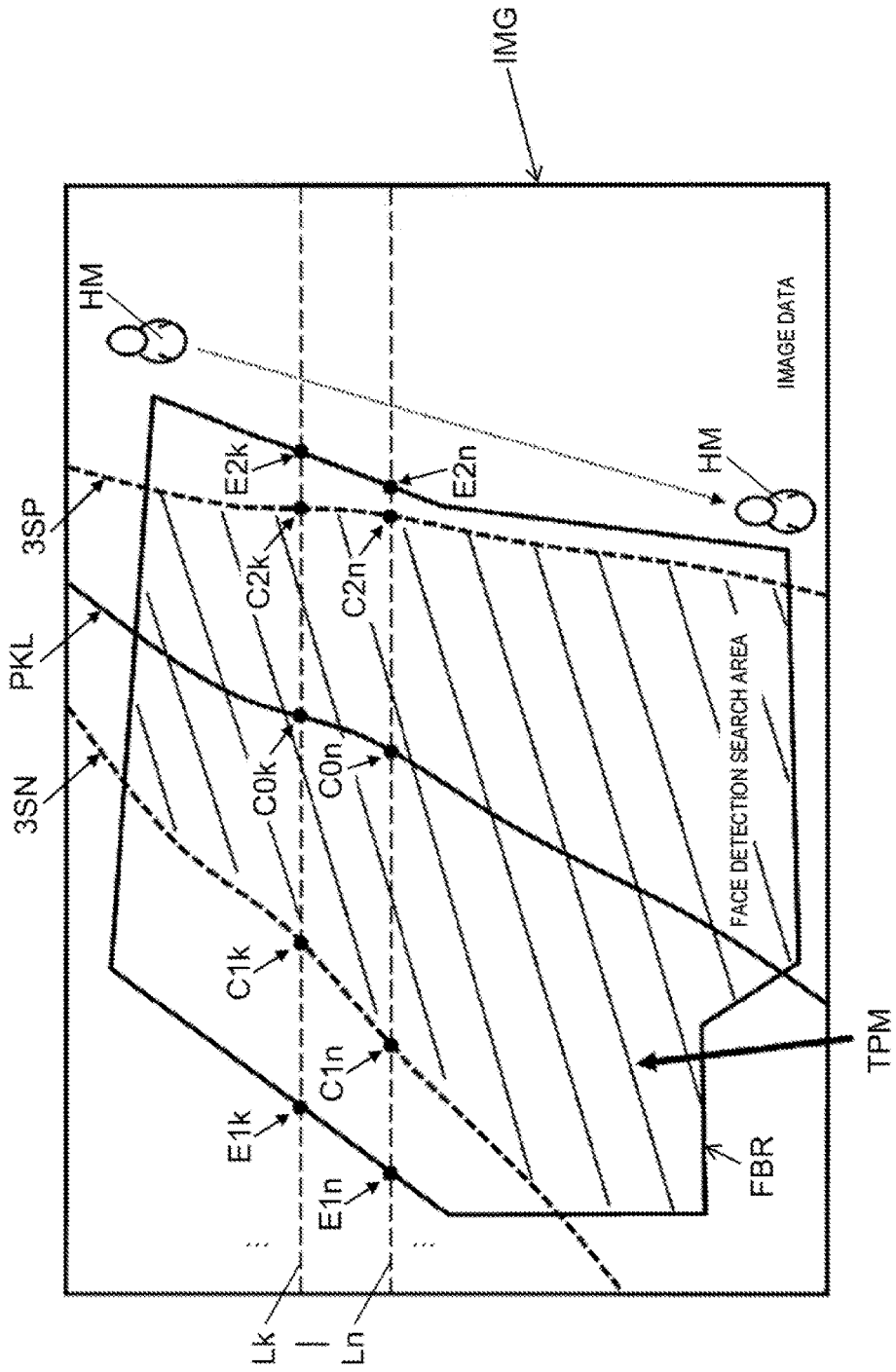

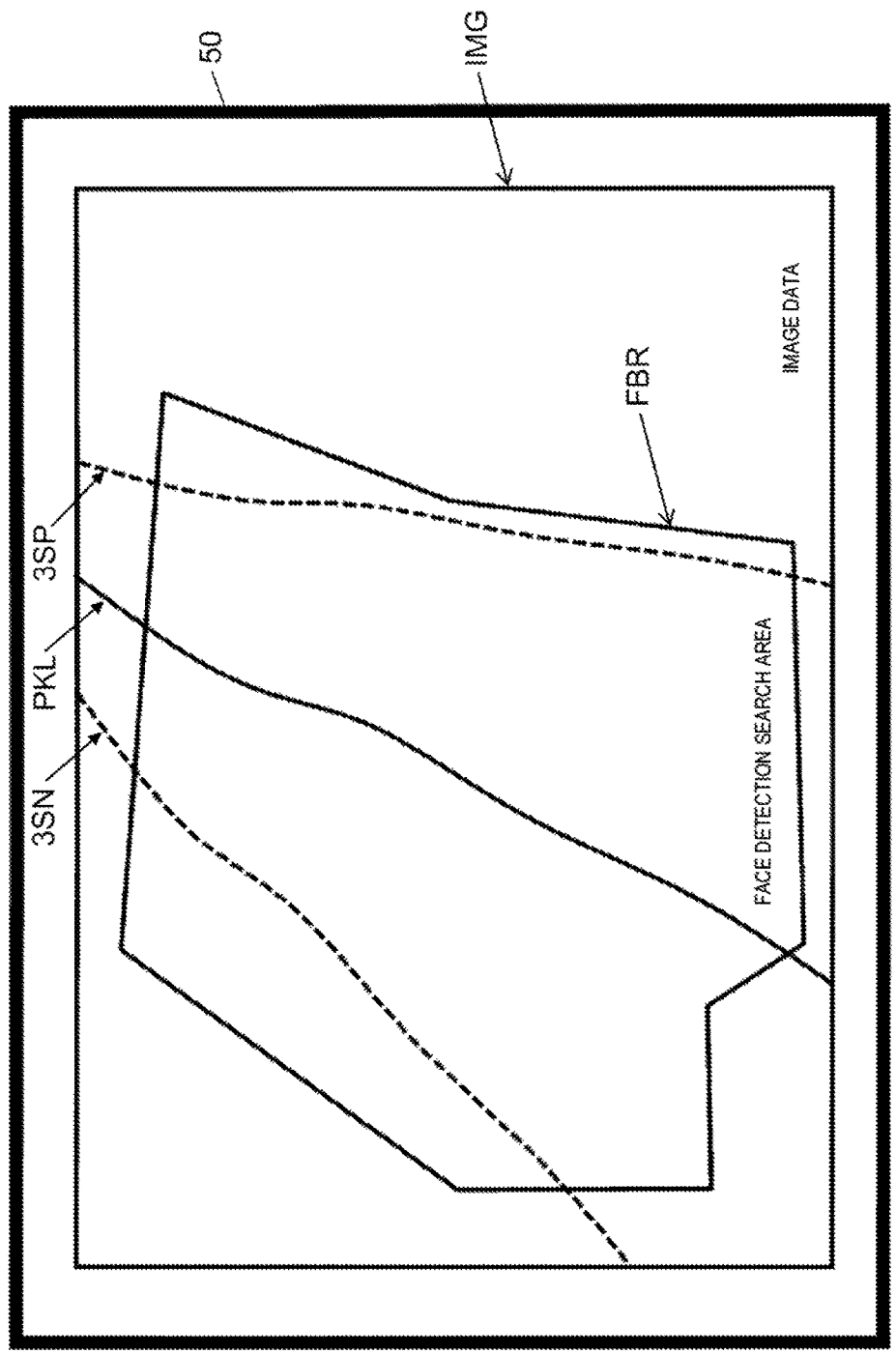

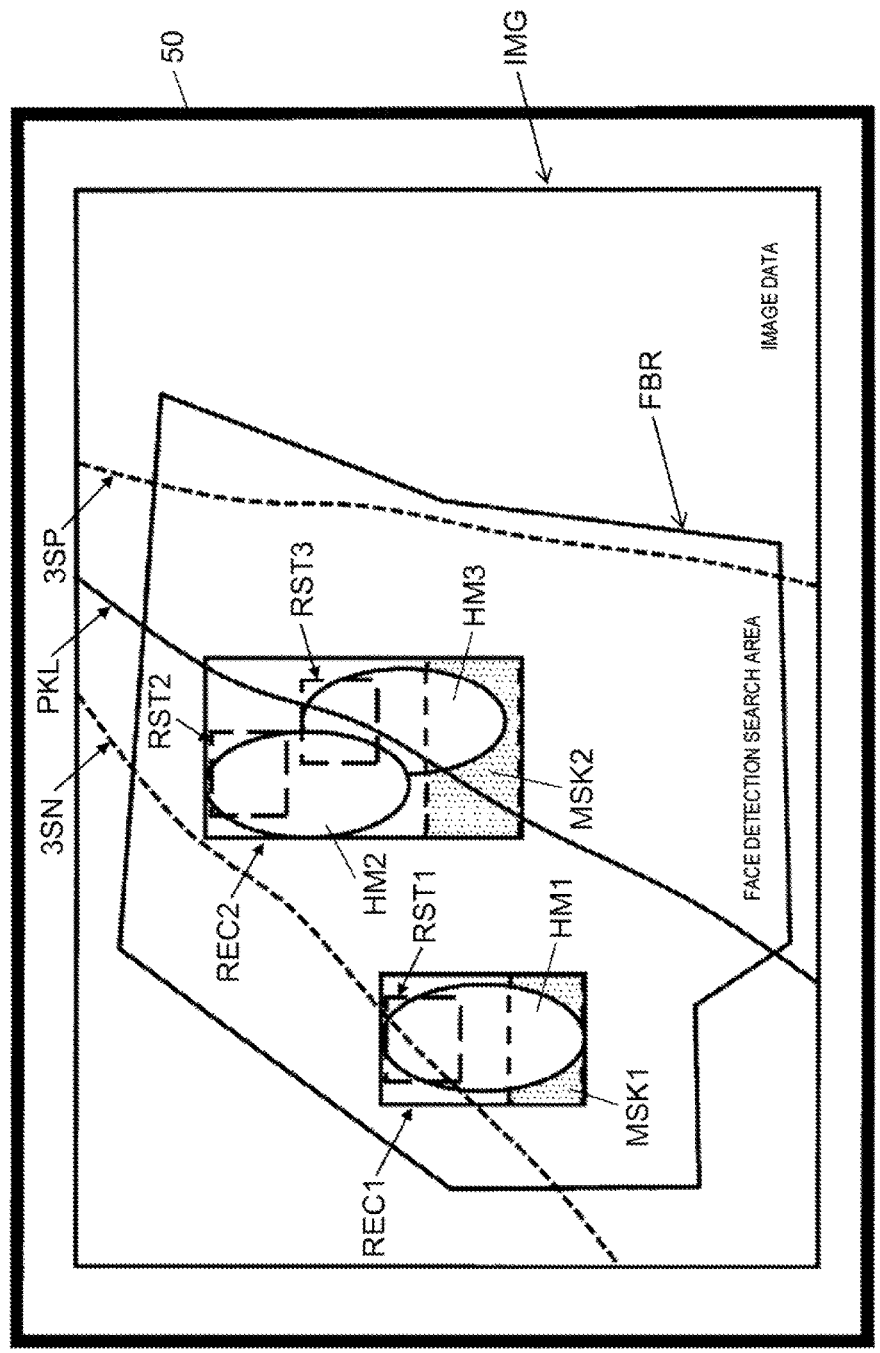

TARGET PICKUP DEVICE AND TARGET DETECTION METHOD

TECHNICAL FIELD

The present invention relates to an image pickup device that detects a characteristic part of a person from an image obtained by imaging and a characteristic part detection method.

BACKGROUND ART

In recent years, use of face detection processing that classifies image data of a video image obtained by imaging into characteristic parts (for example, a face) of a person has been promoted in various fields. Performing processing at a high speed by reducing an amount of calculation as well as a face discrimination accuracy are important in face detection processing.

Here, as prior art relating to the face detection processing in which the amount of calculation is reduced and the processing speed is increased, for example, a face detection device disclosed in PTL 1 is suggested.

The face detection device disclosed in PTL 1 switches a face detection mode in which a face detection area is set according to a designation by a user and sets a face type template of a size corresponding to the face detection mode. The face detection device performs template matching processing on a face detection area range using the set face type template.

In the face detection device, the minimum value and maximum value of the size of the face type template is determined for each face detection mode in advance. In a case where a face cannot be detected in the template matching processing using the face type template of the maximum size, the face detection device performs the template matching processing using the face type template of the next largest size in the same face detection mode.

CITATION LIST

Patent Literature

PTL 1: Japanese Patent Unexamined Publication No. 2008-211534

SUMMARY OF THE INVENTION

An image pickup device of the present invention includes an image pickup unit that captures a video image, a mask area determination unit that determines a mask area, for which processing for detection of a characteristic part of a target is excluded, in a portion or the entirety of an area of image data of the video image captured by the image pickup unit, and a characteristic part detector that performs the processing for detection of the characteristic part of the target on a detection target area obtained by excluding the mask area determined by the mask area determination unit from the portion or the entirety of the area of the image data of the video image captured by the image pickup unit.

A characteristic part detection method in the image pickup device of the present invention includes a step of imaging a video image, a step of determining a mask area, for which processing for detection of a characteristic part of a target is excluded, among a portion or the entirety of an area of image data of the imaged video image, and a step of performing the detection processing of the characteristic part of the target on a detection target area obtained by excluding the determined mask area from the portion or the entirety of the area of the image data of the imaged video image.

According to the present invention, it is possible to extract a mask area, for which face detection processing can be omitted, from the image data without regarding an entire area of an image data as a target to realize an increase in a speed of the face detection processing.

BRIEF DESCRIPTION OF DRAWINGS

FIG. 5 is an explanatory diagram of a face detection target area which becomes a target of pattern matching processing in the second exemplary embodiment.

FIG. 7 is a diagram illustrating a face detection target area which becomes a target of the pattern matching processing and is displayed on a display of a monitor terminal, a peak line, +3σ line, and −3σ line of a frequency distribution representing a detection rate of a person.

FIG. 12 is an explanatory diagram of a face detection target area which becomes a target of the pattern matching processing in a case where the second and third exemplary embodiments are combined.

DESCRIPTION OF EMBODIMENTS

Hereinafter, respective exemplary embodiments of an image pickup device and a characteristic part detection method according to the present invention will be described with reference to drawings. The present invention is not limited to an invention of an apparatus category of an image pickup device, an invention of a process category of a characteristic part detection method, but may also be an invention of a system category of an image processing system including the image pickup device and a monitor terminal (for example, a personal computer (PC)) which will be described later.

As an image pickup device of each exemplary embodiment, a monitoring camera which is fixed to a predetermined position (for example, a ceiling surface) or supported by being suspended from a predetermined surface is described by way of an example. The image pickup device of each exemplary embodiment may also be a digital camera used by being grasped by a user. The image pickup device of each exemplary embodiment may also be used as an on-vehicle camera installed on a moving object (for example, a railroad, an airplane, a bus, a ship, an automobile, a bike, and a bicycle).

The image pickup device of each exemplary embodiment includes an image pickup unit that captures a video image, a mask area determination unit that determines a mask area, for which processing for detection of a characteristic part (for example, a face, the same hereinafter) of a target (for example, a person, the same hereinafter) is excluded, among a portion or the entirety of an area of image data of the video image captured by the image pickup unit, and a characteristic part detector that performs the processing for detection of the characteristic part of the target on an area obtained by excluding the mask area determined by the mask area determination unit from the portion or the entirety of the area of the image data of the video image captured by the image pickup unit.

The target indicates a subject captured by the image pickup device (example: a monitoring camera, a digital camera, an on-vehicle camera) of each exemplary embodiment and is not limited to a person, but may also be an object other than the person. In a case where the target is a person, the person is not limited to a single person, but may also be a plurality of persons, and which is also similar to a case where the target is an object. Although the face of the person is exemplified as a characteristic part in order to make descriptions of the following exemplary embodiments easily understandable, the characteristic part is not limited to the face and may also be other parts and it does not matter as long as the characteristic part, for example, eyebrows, eyes, a nose, and a mouth, or the like, can explicitly specify a person.

First Exemplary Embodiment

Figure 1:
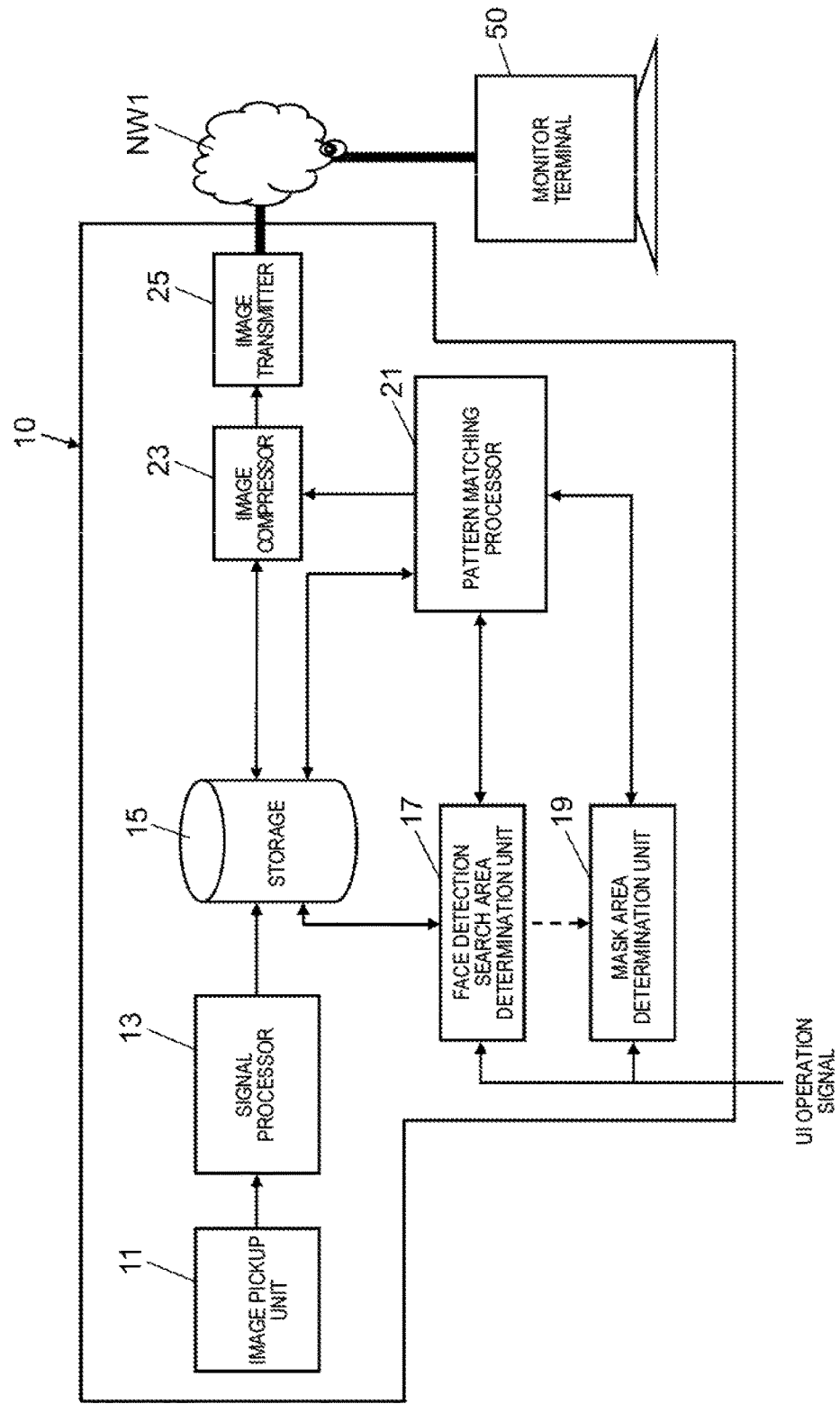
FIG. 1 is a block diagram illustrating an example of an internal configuration of an image pickup device of a first exemplary embodiment in detail.

First, a configuration of image pickup device 10 of the first exemplary embodiment will be described with reference to FIG. 1. FIG. 1 is a block diagram illustrating an example of an internal configuration of image pickup device 10 of a first exemplary embodiment in detail. Image pickup device 10 shown in FIG. 1 is configured to include image pickup unit 11, signal processor 13, storage 15, face detection search area determination unit 17, mask area determination unit 19, pattern matching processor 21, image compressor 23, and image transmitter 25. Image pickup device 10 is connected with monitor terminal 50 through network NW1. Network NW1, for example, may also be a wired network (for example, the Internet and the Ethernet) or a wireless network (for example, a wireless local area network (LAN) or wireless wide area network (WAN)).

Image pickup unit 11 is configured to include at least a lens, a diaphragm, a shutter, and an image sensor. The lens (not shown) is configured using one or more optical lens in order to form a subject image toward an imaging surface of an image sensor and is, for example, a single focal lens, a zoom lens, a fish eye lens, or a lens capable of obtaining an angle of view which is a wide angle having a predetermined angle or more.

The diaphragm (not shown) is disposed in the rear of the lens in an optical axis. The diaphragm has a variable diaphragm value (diameter) and limits a light quantity of subject light passing through the lens. The shutter is disposed in the rear of the diaphragm. The shutter alternately performs an opening operation and a closing operation at the time of imaging of image pickup device 10 at a predetermined shutter speed and allows the subject light passing through the diaphragm to pass through the image sensor.

The image sensor is configured using a solid-state imaging device, for example, a charge coupled device (CCD) or a complementary metal oxide semiconductor (CMOS) and converts a subject image formed on an imaging surface of the image sensor using gains, which is set in advance, of the image sensor into an electrical signal. An output (electrical signal of subject image) of the image sensor is input to signal processor 13.

Any of the diaphragm value of the diaphragm, the shutter speed of the shutter, and the gain of the image sensor is called a camera parameter in image pickup device 10 and constitutes exposure conditions at the time of imaging. Although detailed description will be omitted, image pickup unit 11 may also image a video image under a plurality of different exposure conditions using a plurality of camera parameters which are set by a camera parameter control driver which is not shown.

Signal processor 13, for example, is configured using a central processing unit (CPU), a micro processing unit (MPU), or a digital signal processor (DSP), and generates a frame of image data referred to as RAW data having, for example, a red green blue (RGB) format or a YUV (brightness and color difference) format as image data of the video image in compliance with a predetermined format using the electrical signal of the subject image generated by photoelectric conversion of the image sensor.

Signal processor 13 may also perform high dynamic range (HDR) processing on image data obtained by subjecting the image data referred to as the RAW data to predetermined image processing (for example, filtering processing, median processing, noise reduction processing, the same hereinafter) or image data imaged using a plurality of exposure conditions to generate image data of which the dynamic range is enlarged. Signal processor 13 is not limited to a case of being configured using any of the CPU, the MPU, or the DSP described above and may also be configured using a field programmable gate array (FPGA) which is programmable, for example.

Storage 15 is configured using a semiconductor memory, for example, a random access memory (RAM) or a flash memory and stores the image data generated by signal processor 13 and a pattern matching processing result (for example, face detection result, the same hereinafter) in pattern matching processor 21. Storage 15 may also be a hard disk device built in image pickup device 10 or an external connection medium (for example, a semiconductor memory such as a flash memory) capable of being connected through a universal serial bus (USB) terminal, for example.

Face detection search area determination unit 17 is configured using, for example, the CPU, the MPU, or the DSP, and determines a target area (hereinafter, referred to as a "face detection search area") of the face detection processing in pattern matching processor 21 among the entire area of the image data displayed on the display based on a user interface (UI) operation signal according to an input operation to a display by a user who operates monitor terminal 50 in a case where the image data saved in storage 15 is displayed on monitor terminal 50.

In other words, when the user performs an operation to indicate the face detection search area from the entire area of the image data displayed on the display of monitor terminal 50, face detection search area determination unit 17 determines the face detection search area according to the input operation of the user. Face detection search area determination unit 17 outputs information (for example, coordinates indicating a range of the face detection search area) about the determined face detection search area to pattern matching processor 21 or mask area determination unit 19. Face detection search area determination unit 17 is not limited to a case of being configured using any of the CPU, the MPU, or the DSP described above, but may also be configured using, for example, the programmable FPGA.

Mask area determination unit 19 is configured using, for example, the CPU, the MPU, or the DSP, and determines a mask area for which the face detection processing is excluded in pattern matching processor 21 among the entire area of the image data displayed on the display based on a user interface (UI) operation signal according to an input operation to a display by a user who operates a monitor terminal 50 in a case where the image data saved in storage 15 is displayed on monitor terminal 50.

In other words, when the user performs an operation to indicate the mask area from the entire area of the image data displayed on the display of monitor terminal 50, mask area determination unit 19 determines the mask area according to the input operation of the user. Mask area determination unit 19 outputs information (for example, coordinates indicating a range of the mask area) about the determined mask area to pattern matching processor 21. Mask area determination unit 19 is not limited to a case of being configured using any of the CPU, the MPU, or the DSP described above, but may also be configured using, for example, the programmable FPGA.

In a case where information about the face detection search area is acquired from face detection search area determination unit 17, mask area determination unit 19 may also determine the mask area for which the face detection processing is excluded in pattern matching processor 21 of the face detection search area of the image data displayed on the display based on the similar UI operation signal.

Pattern matching processor 21 is configured using, for example, the CPU, the MPU, or the DSP, and performs detection processing of the characteristic part (for example, the face) of the target (for example, the person) on an area (hereinafter, referred to as a "face detection target area") obtained by excluding the mask area determined by mask area determination unit 19 from the entirety of an area of the image data displayed on the display or the face detection search area. Specifically, pattern matching processor 21 includes a plurality of identifying parts (not shown) and evaluates a degree of coincidence with of an image of each learning model using an image of a face of a specific angle or a specific part of the face obtained by learning each time when performing the detection processing as a learning model to thereby perform the detection processing of the characteristic part (for example, the face) of the person by evaluating the degree of coincidence with the image of each learning model.

The specific angle of the face, for example, is the front direction, a direction rotated from the front direction by 45 degrees, and a direction where the faces is directed at 35 degrees in an upward direction or a downward direction in a case where the front direction of the face is set as a reference. The 45 degrees or 35 degrees is an example, and an angle value is not limited. The specific part of the face is an upper part of the face, for example, the nose, but is not limited thereto. In each identifying part of pattern matching processor 21, the degree of coincidence is determined using the image of the face of the specific angle or the specific part of the face described above and a result having the highest degree of coincidence among respective identifying parts is obtained as a face detection result in pattern matching processor 21.

Pattern matching processor 21 is not limited to the face detection processing described above and may also perform the detection processing of respective parts (eyebrows, eyes, nose, mouth) using a template for parts constituting the characteristic part of the face, for example, the eyebrows, the eyes, the nose, the mouth, or the like. The image data such as the average face, eyebrows, eyes, nose, mouth, or the like used in the detection processing of the respective parts are saved in pattern matching processor 21 or storage 15 in advance. Pattern matching processor 21 is not limited to a case of being configured using any of the CPU, the MPU, or the DSP described above, but may also be configured using, for example, the programmable FPGA.

In pattern matching processor 21, the face detection processing itself is a known technique and thus, detailed description will be omitted, however, in the present embodiment, a target range for the face detection processing is different, is not the entire area of image data, and is narrowed to a face detection target area obtained by excluding the mask area from the entire area. For that reason, pattern matching processor 21 can reduce the amount of calculation for the face detection processing and perform the face detection processing at a higher speed.

Image compressor 23 is configured using, for example, codec, and generates encoded data for converting into a data format with which image data can be saved or transmitted, using the image data stored in storage 15. Image compressor 23 outputs the encoded data to image transmitter 25.

Image transmitter 25, for example, is configured using a communication circuit corresponding to wired communication or wireless communication, performs packet generation processing for transmitting a packet to monitor terminal 50 which is a transmission destination, for example, using the encoded data of the image data generated by image compressor 23, and transmits the packet of the encoded data to monitor terminal 50 through network NW1. With this, image pickup device 10 can transmit the encoded data of the image data to monitor terminal 50.

Monitor terminal 50 is a PC operated by a user (for example, a monitoring person), receives the image data transmitted from image pickup device 10, and displays the image data on the display of monitor terminal 50. Monitor terminal 50 can receive various input operations to the image data displayed on the display and transmits the UI operation signal according to the input operation to image pickup device 10 through network NW1.

With this, monitor terminal 50 can instruct various operations to the image data captured by image pickup device 10 according to the UI operation signal by the input operation of the user. Various input operations in the present embodiment, for example, are an operation to newly designate the face detection search area, an operation to change the face detection search area designated once, an operation to newly designate the mask area, or an operation to change the mask area designated once.

Figure 2:
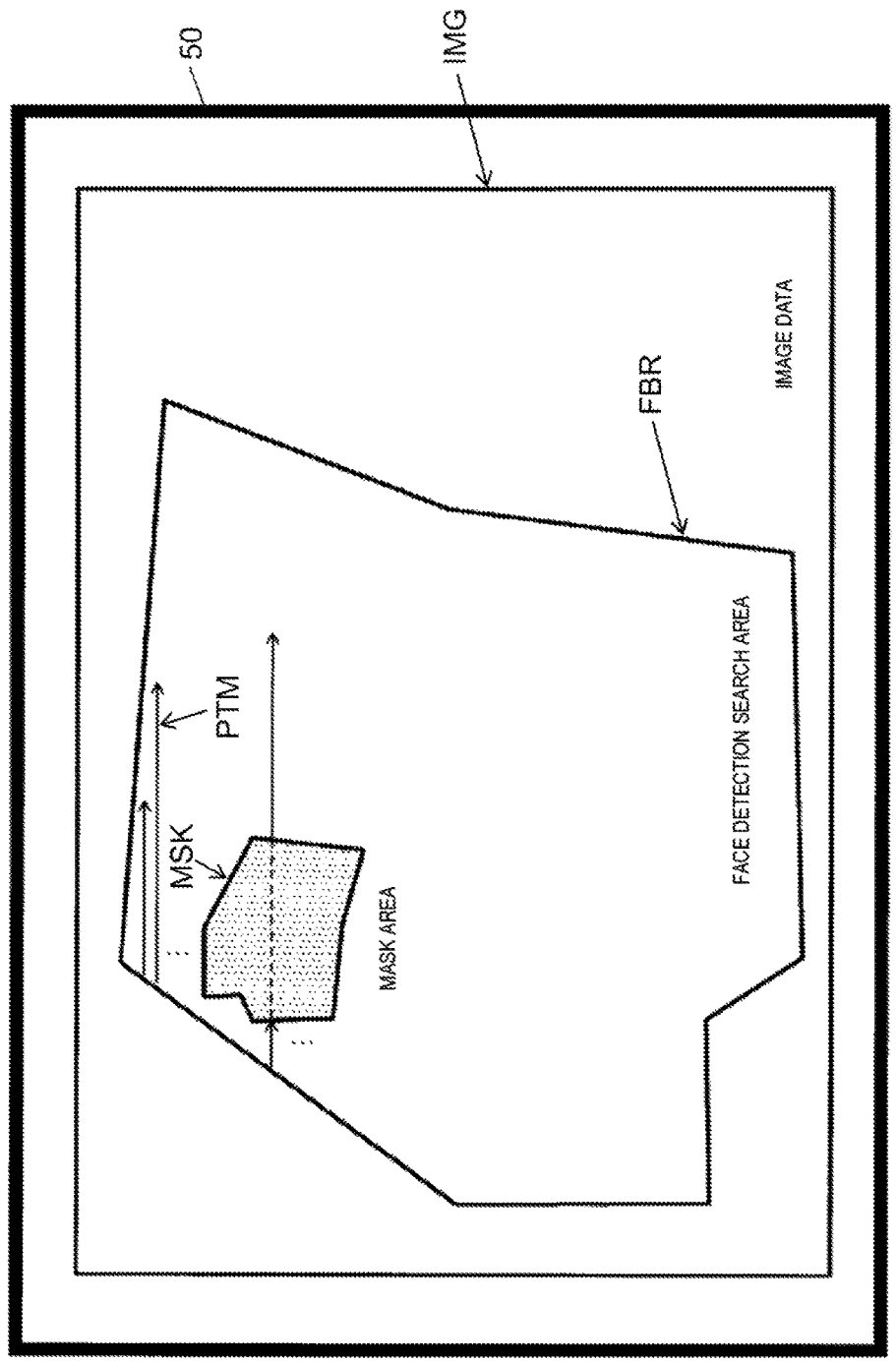
FIG. 2 is an explanatory diagram of a face detection target area which becomes a target of pattern matching processing in the first exemplary embodiment.

FIG. 2 is an explanatory diagram of the face detection target area which becomes a target of the pattern matching processing in the first exemplary embodiment. In FIG. 2, image data IMG captured by image pickup device 10 is displayed on the display of monitor terminal 50, and face detection search area FBR determined by face detection search area determination unit 17 and mask area MSK determined by mask area determination unit 19 are displayed.

Pattern matching processor 21 performs the pattern matching processing (face detection processing) along arrow line PTM from the left to the right in the horizontal direction of the paper surface in face detection search area FBR shown in FIG. 2 and omits the face detection processing to mask area MSK. Accordingly, in the exemplary embodiments including the present embodiment, the amount of calculation of the face detection processing in pattern matching processor 21 is obtained by reducing the amount of calculation in a case of regarding an area corresponding to a total of an area of (the entire area of image data IMG−face detection search area FBR) as a target and mask area MSK from the amount of calculation in a case of regarding the entire area of image data IMG as a target. With this, pattern matching processor 21 performs the face detection processing at a higher speed compared to the template matching processing.

Figure 3:
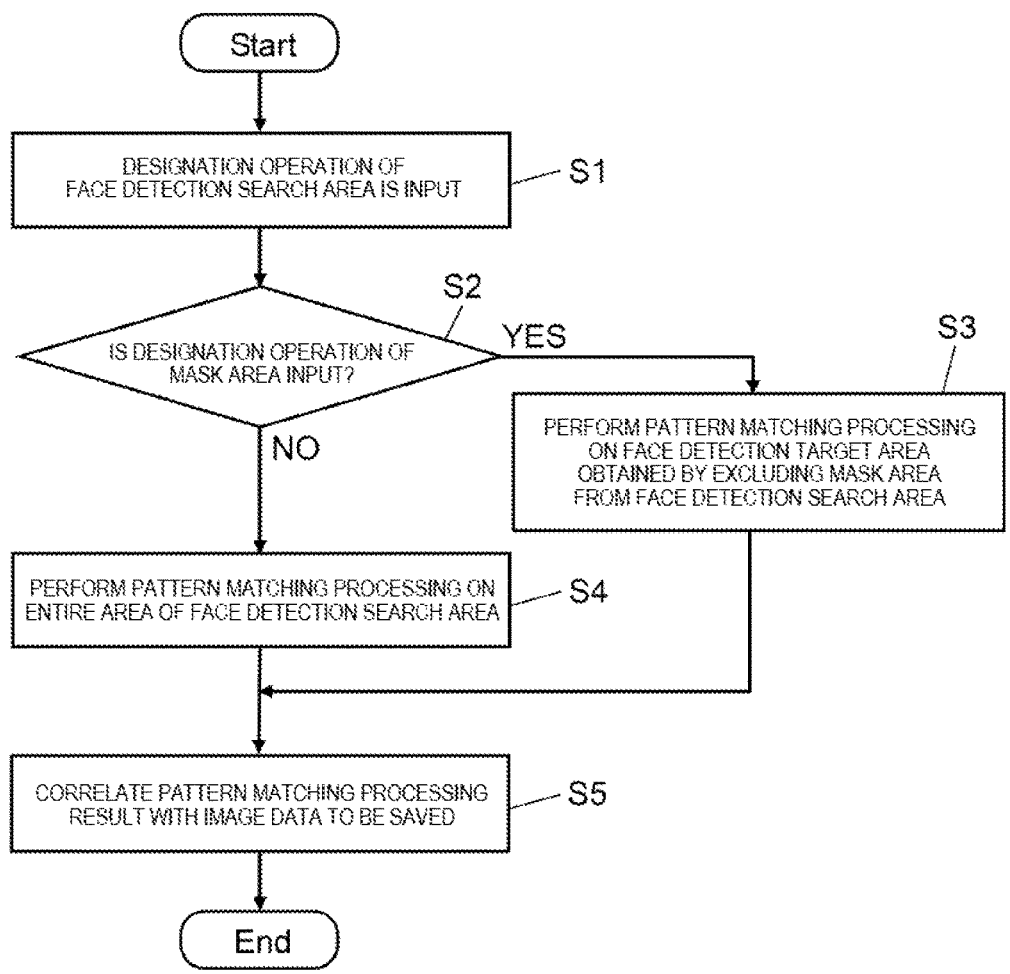
FIG. 3 is a flowchart for explaining an example of an operation procedure relating to the pattern matching processing of the image pickup device of the first exemplary embodiment in detail.

Next, the operations of the pattern matching processing of the image pickup device of the present embodiment will be described with reference to FIG. 3. FIG. 3 is a flowchart for explaining an example of an operation procedure relating to the pattern matching processing of image pickup device 10 of the first exemplary embodiment in detail. As a premise for the description indicated in FIG. 3, the image data which becomes the target of the pattern matching processing is set in a state of already having been imaged and being displayed on the display of monitor terminal 50.

In FIG. 3, it is regarded that the designation operation of the face detection search area by the user is input to the display of monitor terminal 50 (S1). According to the designation operation input in Step S1, monitor terminal 50 transmits the UI operation signal according to the designation operation of the face detection search area to image pickup device 10. Image pickup device 10 determines the face detection search area which becomes a target range of the pattern matching processing (for example, the face detection processing) from the entire area of the imaged image data according to the UI operation signal corresponding to the designation operation of the face detection search area.

Here, in a case where the designation operation of the mask area of the user is input to the display of monitor terminal 50 (S2, YES), monitor terminal 50 transmit the UI operation signal according to the designation operation of the mask area to image pickup device 10. Image pickup device 10 determines the mask area, for which the pattern matching processing (for example, the face detection processing) is excluded, from the entire area of the imaged image data or the face detection search area according to the UI operation signal corresponding to the designation operation of the mask area.

Image pickup device 10 performs the face detection processing for the face detection target area obtained by excluding the mask area from the face detection search area among the imaged image data (that is, the image data displayed on the display of monitor terminal 50) (S3).

On the other hand, in a case where the designation operation of the mask area of the user is not input to the display of monitor terminal 50 (S2, NO), image pickup device 10 performs the face detection processing for the designated face detection search area among the imaged image data (that is, the image data displayed on the display of monitor terminal 50) (S4).

After Step S3 or Step S4, image pickup device 10 correlates the face detection processing result with the image data which was the target of the face detection processing to be saved in storage 15 (S5). With this, description of the operations of image pickup device 10 shown in FIG. 3 is ended.

Thus, image pickup device 10 of the present embodiment determines the mask area, for which the detection processing of the characteristic part (for example, the face) of the target (for example, the person) is excluded, among a portion or the entirety of an area of the image data of the video image captured by image pickup unit 11, according to the input operation of the user who operates monitor terminal 50. Image pickup device 10 performs the face detection processing of the person for the face detection target area obtained by excluding the mask area from the portion or the entirety of an area of the image data.

With this, image pickup device 10 easily extracts the mask area, for which the face detection processing of the person can be omitted, among the image data and performs the face detection processing for an area obtained by excluding the mask area from the entire area of the image data and thus, image pickup device 10 can perform the face detection processing at a high speed without regarding the entire area of the image data obtained by imaging as a detection processing target.

Second Exemplary Embodiment

In the first exemplary embodiment, mask area determination unit 19 of image pickup device 10 determines the mask area according to the UI operation signal by the input operation of the user who operates monitor terminal 50.

In the second exemplary embodiment, mask area determination unit 19A of image pickup device 10A sets a plurality of virtual lines in imaged image data IMG, calculates a frequency distribution indicating a detection rate of the target (for example, a person) of which motion is detected for each virtual line and generates the frequency distribution, and determines the mask area based on the frequency distribution for each virtual line.

In the description of image pickup device 10A of the second exemplary embodiment, descriptions of the same configuration and constitutional elements of operations as those of image pickup device 10 of the first exemplary embodiment are simplified or omitted as image pickup device 10 and different contents will be described.

Figure 4:
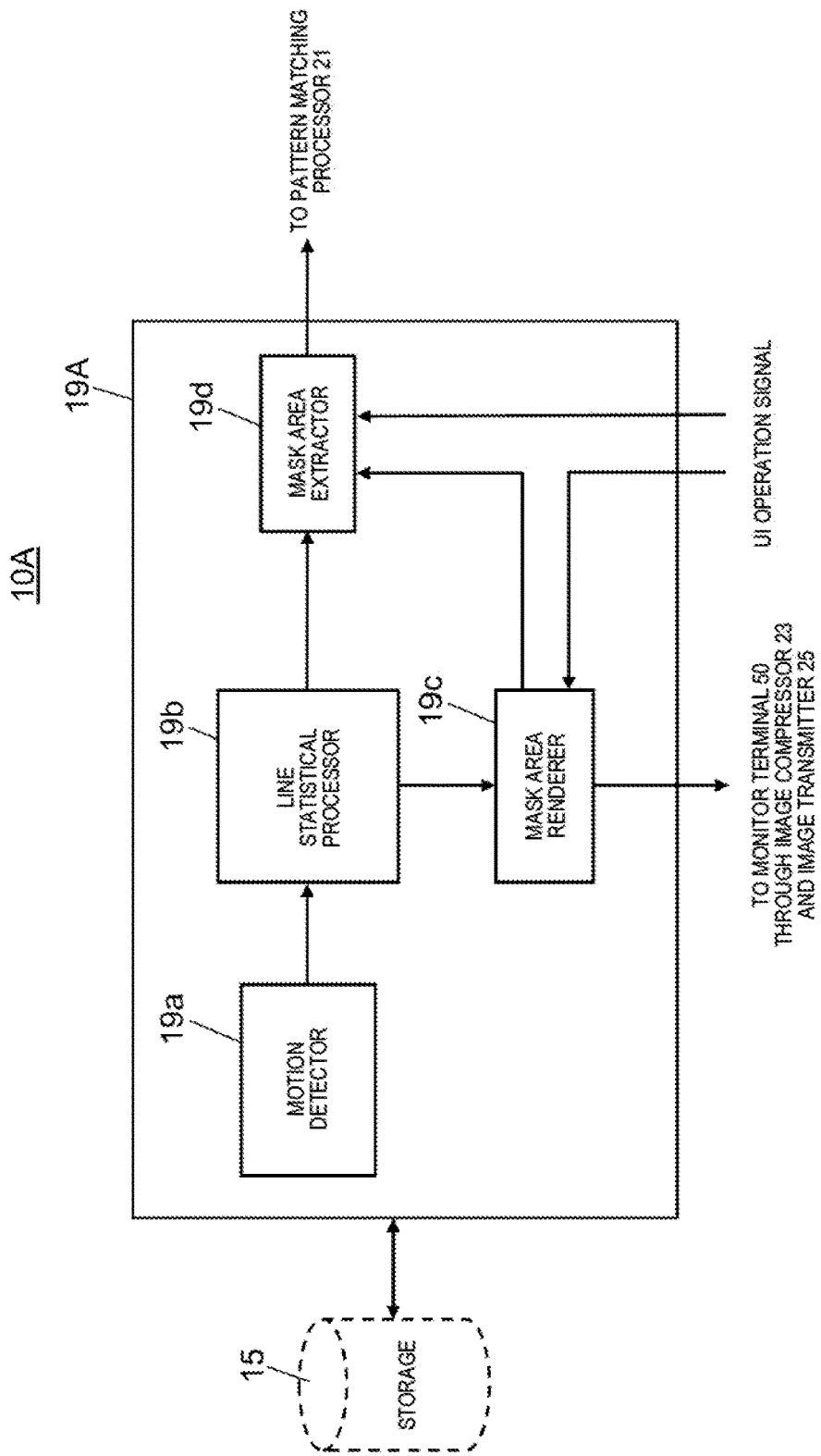
FIG. 4 is a block diagram illustrating an example of an internal configuration of a mask area determination unit of an image pickup device of a second exemplary embodiment in detail.

FIG. 4 is a block diagram illustrating an example of an internal configuration of mask area determination unit 19A of image pickup device 10A of a second exemplary embodiment in detail. Mask area determination unit 19A shown in FIG. 4 is configured to include motion detector 19a, line statistical processor 19b, mask area renderer 19c, and mask area extractor 19d. Each component of mask area determination unit 19A, for example, is configured using the CPU, the MPU, the DSP, or the FPGA.

Motion detector 19a reads the image data captured by image pickup unit 11 from storage 15 and performs video motion detector (VMD) processing for a certain period of time (for example, 1 day, 1 week, or 1 month) at each predetermined period, and detects the presence or absence of motion of the target (for example, the person) in the image data. The VMD processing itself is a known technique and thus detailed description will be omitted, however, motion detector 19a, for example, detects the presence or absence of a motion of a target based on a difference between image data of a background which is not the target and the image data captured by image pickup unit 11. Motion detector 19a may also perform known person detection processing other than the VMD processing to detect the presence or absence of the target (for example, the person) in the image data. Motion detector 19a outputs the processing result of the VMD processing to line statistical processor 19b.

Line statistical processor 19b sets a plurality of virtual lines (see FIG. 5) in image data IMG captured by image pickup unit 11 using the output (processing result of the VMD processing or the person detection processing, in the following, descriptions will be made using the VMD processing result as an example) of motion detector 19a and calculates a frequency distribution indicating the detection rate of the person whose motion is detected for each virtual line (for example, virtual line Lk) and generates the frequency distribution. Here, the operations of line statistical processor 19b will be described with reference to FIG. 5, FIG. 6A, and FIG. 6B in detail.

Figures 6A, 6B:
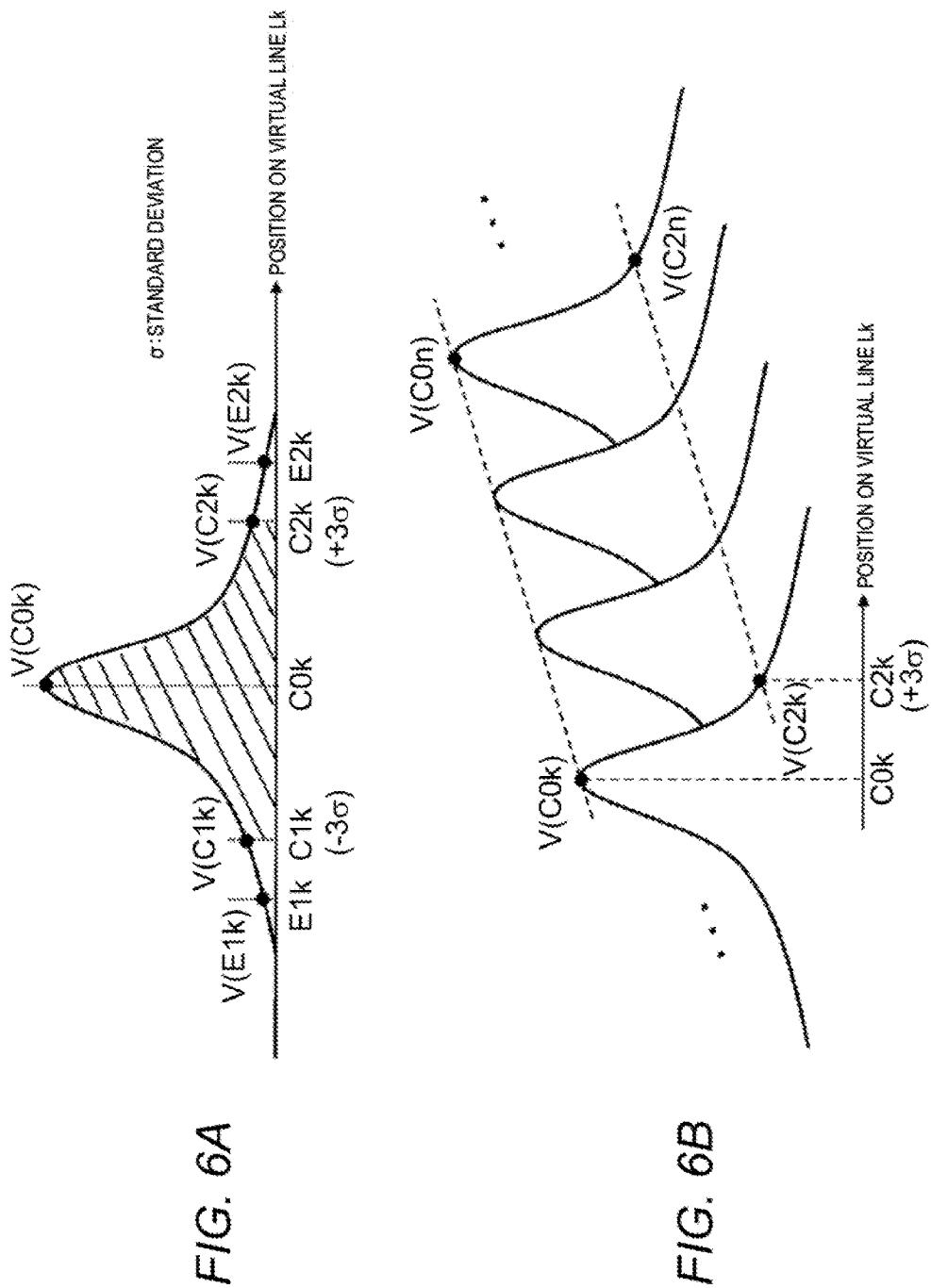
FIG. 6A is a diagram illustrating an example of a frequency distribution representing a detection rate of a person to a position on a virtual line Lk.
FIG. 6B is an explanatory diagram representing a peak value and a "peak value+3σ" of the frequency distribution shown in FIG. 6A.

FIG. 5 is an explanatory diagram of face detection target area FBR which becomes a target of the pattern matching processing in the second exemplary embodiment. FIG. 6A is a diagram illustrating an example of a frequency distribution representing a detection rate of a person to a position on virtual line Lk. FIG. 6B is an explanatory diagram representing a peak value and a "peak value+3σ" of the frequency distribution shown in FIG. 6A. Here, σ indicates standard deviation of the frequency distribution indicating the detection rate of the person, whose motion is detected, on any one of the virtual lines (for example, virtual line Lk) and is obtained by statistical processing (calculation) in line statistical processor 19b.

In order to simplify the description, the imaged image data IMG and face detection search area FBR in the present embodiment may be set as the same as the imaged image data IMG and face detection search area FBR in the first exemplary embodiment, but may also be set to be different.

Line statistical processor 19b, for example, calculates a frequency distribution indicating the detection rate of the person in the position of image data IMG corresponding to virtual line Lk using the output of motion detector 19a and generates the frequency distribution in virtual line Lk which is set for image data IMG. In FIG. 6A, for example, the frequency distribution (for example, normal distribution) indicating the detection rate of the person whose motion is detected to the position (specifically, coordinates on virtual line Lk of image data IMG) on virtual line Lk is indicated.

With this, line statistical processor 19b displays image data IMG including a result of the frequency distribution (see, for example, FIG. 6B or FIG. 18) indicating the detection rate of the person for each of a plurality of virtual lines generated using the output (for example, the VMD processing result or the person detection processing result) of motion detector 19a on the display of monitor terminal 50 connected through, for example, mask area extractor 19d and network NW1 to thereby make it possible for the user to easily recognize visually the result (see, for example, a normal distribution curve, or a bar graph, a line graph, a heat map which will be described later) of the frequency distribution indicating the detection rate of the person generated for each of some or a plurality of virtual lines.

In the present embodiment, line statistical processor 19b may also count up (increment) the frequency in a case where the motion of the same person (for example, the same face) is detected on the virtual line in calculating the frequency and as another method, for example, may also count up (increment) the frequency according to a product of information indicating a position on the same virtual line and a time during which the same person is stayed in the position. Furthermore, according to a result of a comparison between the predetermined threshold value and the product of information indicating the position on the same virtual line and the time during which the same person is stayed in the position, line statistical processor 19b may also count up (increment) the frequency in a case where the comparison result exceeds the predetermined threshold value.

In FIG. 6A or FIG. 6B, person HM is detected extremely well in position C0k where peak value V(C0k) of the frequency distribution is obtained. Since it is considered that the frequency distribution follows the normal distribution of statistics, an area (that is, an integrated value of the values of the frequency distribution from position C1k to position C2k) occupied by the hatched area of FIG. 6A of the entire area of the frequency distribution occupies about 99.73%. Position C1k is a position where "peak value V(C0k)− 3σ" of the frequency distribution is obtained. Position C2k is a position where "peak value V(C0k)+3σ" of the frequency distribution is obtained.

Position E1k indicates a first intersecting point (intersecting point of the left shown in FIG. 5) of a boundary line of face detection search area FBR determined by face detection search area determination unit 17 and virtual line Lk in image data IMG shown in FIG. 5. Similarly, position E2k indicates a second intersecting point (intersecting point of the right shown in FIG. 5) of the boundary line of face detection search area FBR determined by face detection search area determination unit 17 and virtual line Lk in image data IMG shown in FIG. 5.

In other words, an area (that is, an area of 99.73% of the entire area of the frequency distribution indicating a detection rate of person HM whose motion is detected) corresponding to the hatched portion shown in FIG. 6A can be considered as an area having a high possibility that person HM is detected on the position on virtual line Lk and an area except for the hatched portion can be considered as an area having a low possibility that person HM is detected. For that reason, for example, the detection rate of person HM is low in the positions E1$k$ and E2$k$ in which values of the frequency distribution V(E1$k$) and V(E2$k$) and thus, may also be considered as the mask area.

Regarding virtual line Ln different from virtual line Lk shown in FIG. 5 also, line statistical processor 19$b$ calculates a frequency distribution indicating the detection rate of person HM and generates the frequency distribution (see FIG. 6B) in the position of image data IMG corresponding to virtual line Ln using the output of motion detector 19$a$. Positions E1$n$, C1$n$, C0$n$, C2$n$, and E2$n$ on virtual line Ln are similar to positions E1$k$, C1$k$ C0$k$, C2$k$ and E2$k$ on virtual line Lk and thus, descriptions thereof will be omitted.

With this, line statistical processor 19$b$ sets a plurality of virtual lines for each predetermined period for image data IMG shown in FIG. 5 even when the UI operation signal according to the input operation of the user is not input and calculates a frequency distribution shown in FIG. 6A for each virtual line and generates the frequency distribution to thereby make it possible to obtain an area in which person HM is precisely detected in image data IMG. Line statistical processor 19$b$ outputs information about the range of the frequency distribution generated for all virtual lines which are set for image data IMG to mask area renderer 19$c$ and mask area extractor 19$d$.

Figure 14:
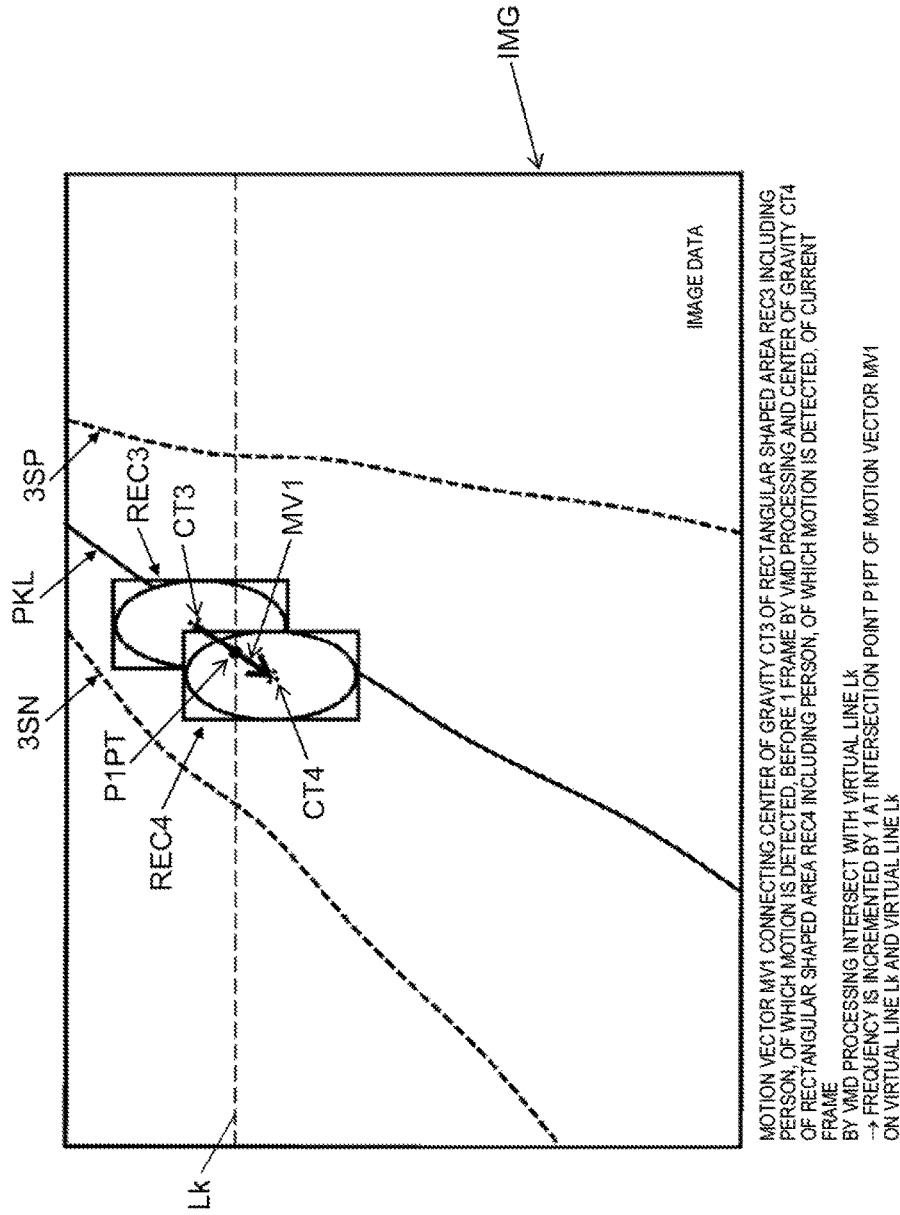
FIG. 14 is an explanatory diagram for explaining a first example of operations of a line statistical processor of the mask area determination unit of the image pickup device of the second exemplary embodiment.
Figure 15:
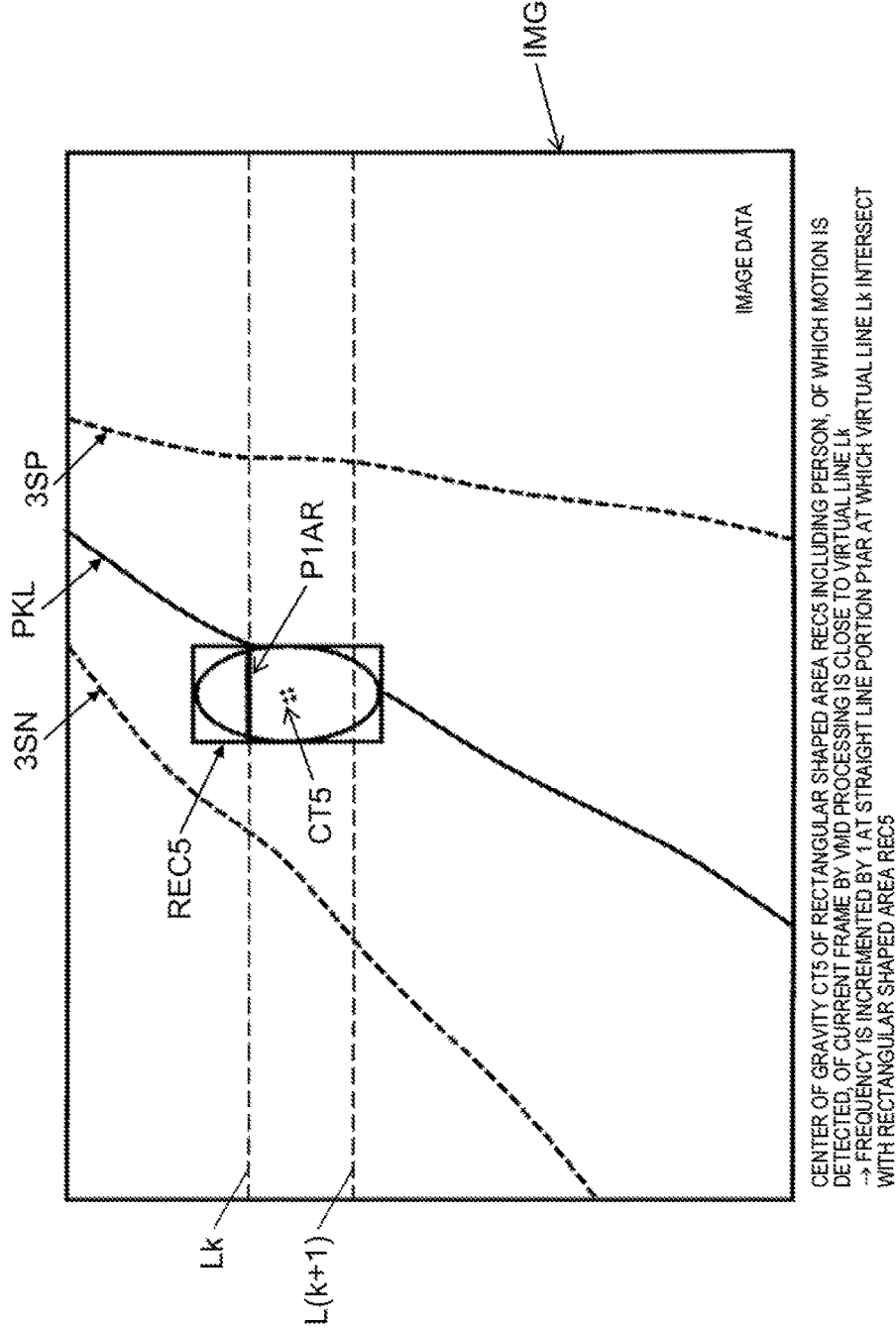
FIG. 15 is an explanatory diagram for explaining a second example of operations of the line statistical processor of the mask area determination unit of the image pickup device of the second exemplary embodiment.

Details of an example of operations of line statistical processor 19$b$ in a case where the VMD processing result in motion detector 19$a$ is input to line statistical processor 19$b$ will be supplemented with reference to FIG. 14 and FIG. 15. FIG. 14 is an explanatory diagram for explaining a first example of operations of line statistical processor 19$b$ of mask area determination unit 19A of image pickup device 10A of the second exemplary embodiment. FIG. 15 is an explanatory diagram for explaining a second example of operations of line statistical processor 19$b$ of mask area determination unit 19A of image pickup device 10A of the second exemplary embodiment.

In FIG. 14, rectangular shaped area REC3 including a target (for example, a person), of which the motion is detected by the VMD processing in motion detector 19$a$, before 1 frame processing and rectangular shaped area REC4 including a target (for example, a person), of which the motion is detected by the VMD processing in motion detector 19$a$, of a current frame are indicated. Information indicating the range of rectangular areas REC3 and REC4 is input to line statistical processor 19$b$.

Line statistical processor 19$b$ increments the frequency of the frequency distribution indicating the detection rate of the person in intersecting point P1PT at which motion vector MV1 connecting center of gravity CT3 of rectangular shaped area REC3 and center of gravity CT4 of rectangular shaped area REC4 intersects with virtual line Lk using the output (information indicating the range of rectangular areas REC3 and REC4) of motion detector 19$a$. With this, line statistical processor 19$b$ can accurately and three-dimensionally obtain a frequency indicating the detection rate of a moving site (position) of the person of image data IMG detected by the VMD processing.

In FIG. 15, rectangular shaped area REC5 including a target (for example, a person) detected before 1 frame processing by the person detection processing in motion detector 19$a$ is indicated. Information indicating the range of the rectangular shaped area REC5 is input to line statistical processor 19$b$.

Line statistical processor 19$b$ increments the frequency of the frequency distribution indicating the detection rate of the person for virtual line Lk, which is close to center of gravity CT5 of rectangular shaped area REC5, of virtual lines Lk and L(k+1) in straight line portion P1AR at which virtual line Lk intersects with rectangular shaped area REC5, using the output (information indicating a range of rectangular shaped area REC5) of motion detector 19$a$. Line statistical processor 19$b$ does not increment the frequency of the frequency distribution indicating the detection rate of the person in a case where the motion of the person is not detected (for example, a case where the person exists but is stationary). With this, line statistical processor 19$b$ can easily and three-dimensionally obtain a frequency distribution indicating the detection rate of a moving site (position) of the person of image data IMG detected by the VMD processing.

Figure 16:
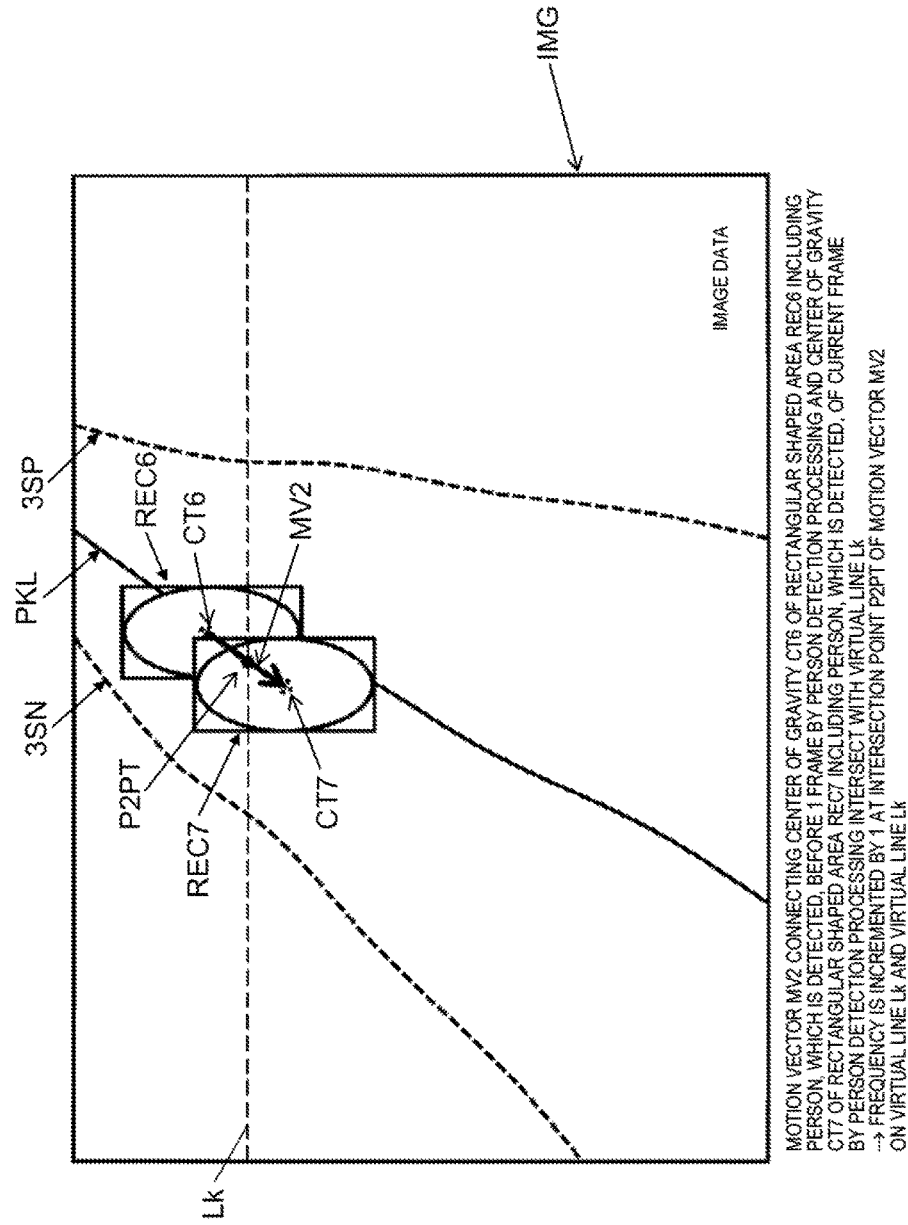
FIG. 16 is an explanatory diagram for explaining a third example of operations of a mask area extractor of the mask area determination unit of the image pickup device of the second exemplary embodiment.
Figure 17:
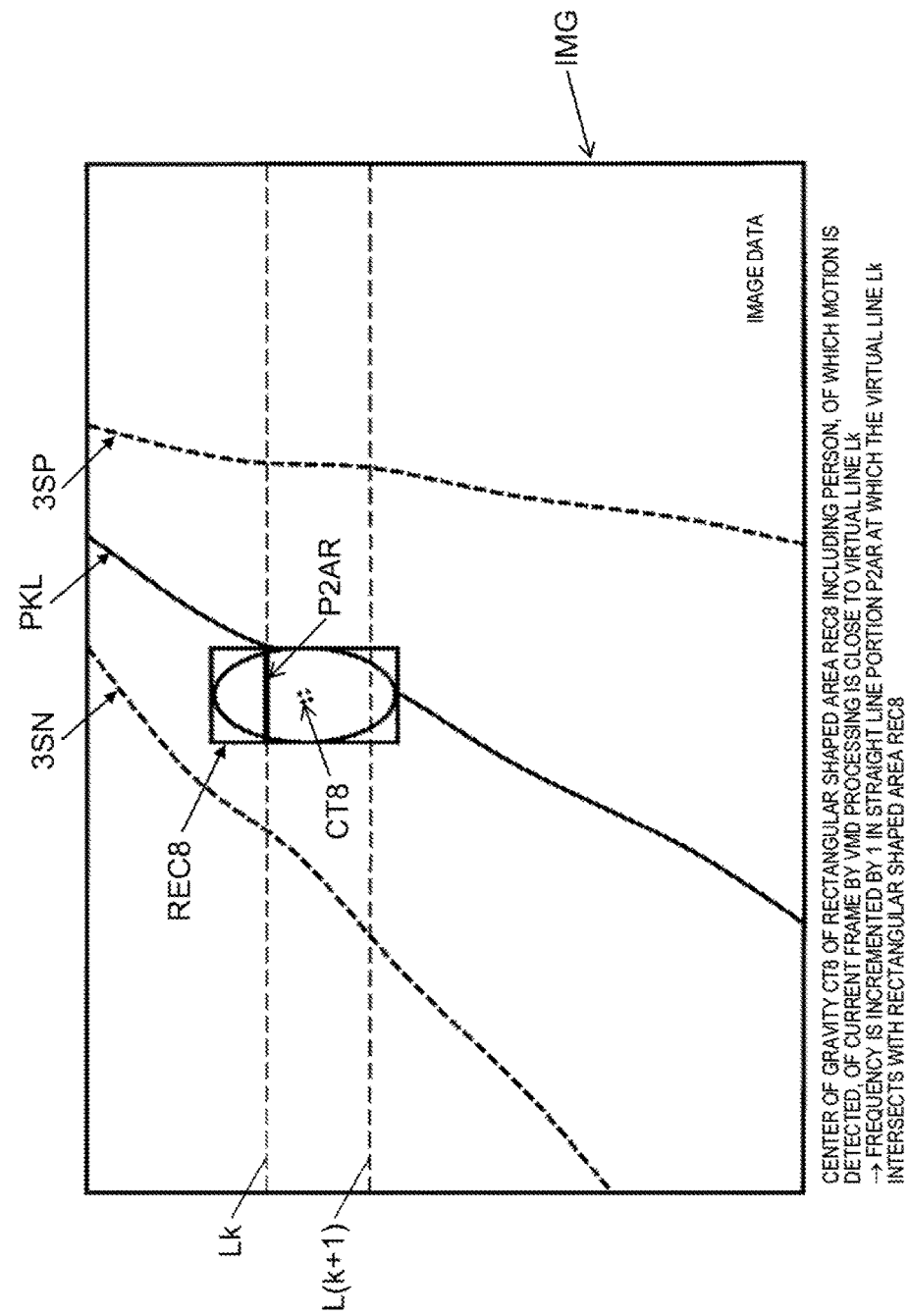
FIG. 17 is an explanatory diagram for explaining a fourth example of operations of the mask area extractor of the mask area determination unit of the image pickup device of the second exemplary embodiment.

Details of an example of operations of line statistical processor 19$b$ in a case where the person detection processing result in motion detector 19$a$ is input to line statistical processor 19$b$ will be supplemented with reference to FIG. 16 and FIG. 17. FIG. 16 is an explanatory diagram for explaining a third example of operations of line statistical processor 19$b$ of mask area determination unit 19A of image pickup device 10A of the second exemplary embodiment. FIG. 17 is an explanatory diagram for explaining a fourth example of operations of line statistical processor 19$b$ of mask area determination unit 19A of image pickup device 10A of the second exemplary embodiment.

In FIG. 16, rectangular shaped area REC6 including a target (for example, a person) detected before 1 frame processing by the person detection processing in motion detector 19$a$ and rectangular shaped area REC7 including a target (for example, a person) detected in the current frame by the person detection processing in motion detector 19$a$ are indicated. Information indicating the range of rectangular areas REC6 and REC7 is input to line statistical processor 19$b$.

Line statistical processor 19$b$ increments the frequency of the frequency distribution indicating the detection rate of the person in intersecting point P2PT at which motion vector MV2 connecting center of gravity CT6 of rectangular shaped area REC6 and center of gravity CT7 of rectangular shaped area REC7 intersects with virtual line Lk using the output (information indicating range of rectangular areas REC6 and REC7) of motion detector 19$a$. With this, line statistical processor 19$b$ can accurately and three-dimensionally obtain a frequency indicating the detection rate of a moving site (position) of the person of image data IMG detected by the person detection processing.

In FIG. 17, rectangular shaped area REC8 including a target (for example, a person) detected before 1 frame processing by the person detection processing in motion detector 19$a$ is indicated. Information indicating the range of rectangular shaped area REC8 is input to line statistical processor 19$b$.

Line statistical processor 19$b$ increments the frequency of the frequency distribution indicating the detection rate of the person for virtual line Lk, which is close to center of gravity CT8 of rectangular shaped area REC8, of the virtual lines Lk and L(k+1) in straight line portion P2AR at which virtual line Lk intersects with rectangular shaped area REC8, using the output (information indicating a range of rectangular shaped area REC8) of motion detector 19a. Line statistical processor 19b increments the frequency of the frequency distribution indicating the detection rate of the person unlike FIG. 15 even in a case where the person is stationary. With this, line statistical processor 19b can three-dimensionally obtain the frequency distribution indicating the detection rate of the moving site (area) of the person of image data IMG detected by the person detection processing and furthermore, the frequency of a site where the person often stays is high and thus, line statistical processor 19b can obtain the frequency distribution for extracting the mask area such that the face detection processing is performed by being narrowed to the position where the person often stays.

Mask area renderer 19c reads image data IMG from storage 15 and renders "−3σ line" 3SN and the "+3σ line" 3SP, which are obtained by connecting the positions at which, for example, "peak value−3σ" and "peak value+3σ" are obtained, on image data IMG as the frequency distribution (see FIG. 6B) generated for all virtual lines which are set for image data IMG using the output (information about a range of the frequency distribution generated for all virtual lines) of line statistical processor 19b.

With this, mask area renderer 19c can render the frequency distribution indicating the detection rate of person HM generated for each of the plurality of virtual lines in image data IMG and display, for example, the rendered image data on the display of monitor terminal 50 connected through network NW1 to thereby make it possible for a user to explicitly indicate an area which becomes a candidate for the mask area to the user (see FIG. 7). FIG. 7 is a diagram illustrating the face detection target area, which becomes the target of the pattern matching processing, and peak line PKL, the "+3σ line" 3SP and the "−3σ line" 3SN of the frequency distribution which indicate the detection rate of the person, which are displayed on the display of monitor terminal 50.

Mask area renderer 19c may also render peak line PKL on image data IMG obtained by connecting the positions at which the peak values are obtained on image data IMG as the frequency distribution (see FIG. 6B) generated for all virtual lines which are set for image data IMG. Mask area renderer 19c outputs image data IMG rendering the peak line PKL, "−3σ line" 3SN, and the "+3σ line" 3SP to image compressor 23. The output (image data IMG in which peak line PKL, "−3σ line" 3SN, and the "+3σ line" 3SP are rendered) of mask area renderer 19c is transmitted to monitor terminal 50 through network NW1 from image transmitter 25.

Mask area renderer 19c renders "−3σ line" 3SN and the "+3σ line" 3SP rendered on image data IMG to be changed into lines indicating a boundary of the mask area corresponding to a value of the detection rate after the change according to the UI operation signal according to the change operation for changing the mask area by the user who operates monitor terminal 50. The operation for changing the mask area is, for example, an operation for changing the value (for example, ±3σ of FIG. 5) of the detection rate indicating the boundary of the mask area.

For example, mask area renderer 19c renders "−2σ line" (not shown) and "+2σ line" (not shown) indicating the boundary of the mask area in a case where a value of the detection rate is changed from the "±3σ" to the "±2σ" by the change operation by the user. With this, mask area renderer 19c can easily change a target range of the face detection processing after taking into consideration the condition of the user, for example, further narrowing the area in which motion of the target (for example, person HM) is precisely detected.

Figure 18:
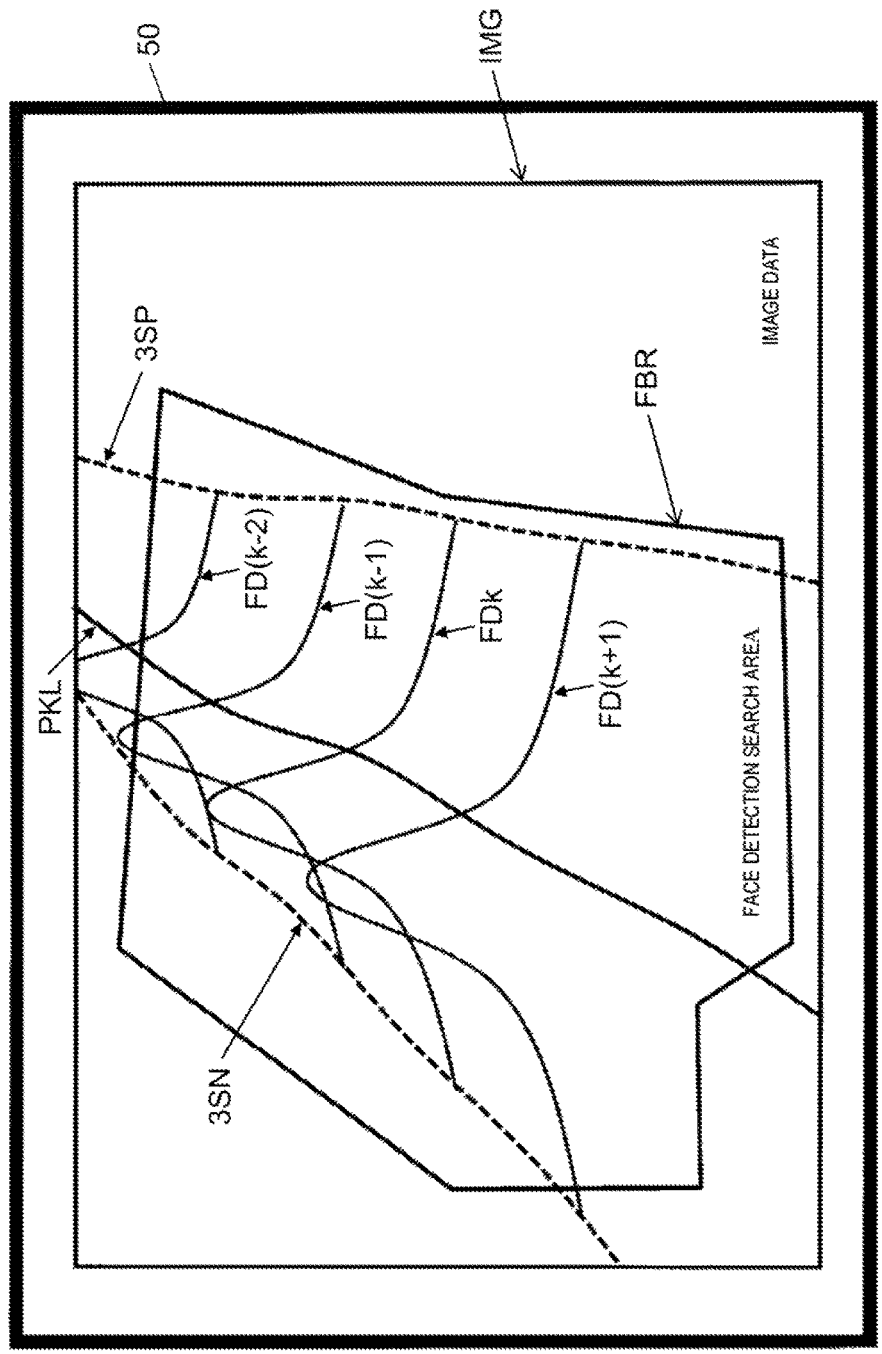
FIG. 18 is an explanatory diagram for explaining an example of operations of a mask area renderer of the mask area determination unit of the image pickup device of the second exemplary embodiment.

Mask area renderer 19c reads image data IMG from storage 15 and may also render curves FD(k−2), FD(k−1), FDk, and FD(k+1) on image data IMG indicating the frequency distribution (see FIG. 6B) generated for some of or all virtual lines which are set for image data IMG using the output (information about the range of the frequency distribution generated for all virtual lines) of line statistical processor 19b (see FIG. 18). FIG. 18 is an explanatory diagram for explaining an example of operations of a mask area renderer of mask area determination unit 19A of image pickup device 10A of the second exemplary embodiment.

With this, mask area renderer 19c displays image data IMG in which curves FD(k−2), FD(k−1), FDk, and FD(k+1) shown in FIG. 18 are rendered on the display of monitor terminal 50 through network NW1 to thereby make it possible for the user to easily and visually recognize the curves of the frequency distribution indicating the detection rate of the person generated for each of some or the plurality of virtual lines.

Mask area renderer 19c may not only render curves FD(k−2), FD(k−1), FDk, and FD(k+1) shown in FIG. 18 on image data IMG but also graphs (for example, a line graph and a bar graph) indicating the frequency distribution (see FIG. 6B) generated for some of or all virtual lines, and a type of a graph indicating the frequency distribution is not limited.

Mask area renderer 19c reads image data IMG from storage 15 and may also render a range surrounded by the "−3σ line" 3SN, peak line PKL, and the "+3σ line" 3SP of the frequency distribution indicating the detection rate of the person such that the range can be classified and identified by a plurality of colors different for respective values of the frequency using the output (information about the range of the frequency distribution generated for all virtual lines) of line statistical processor 19b. For example, mask area renderer 19c renders a heat map in such a way that a color becomes deepest in peak line PKL and the color gradually become lighter from peak line PKL toward "−3σ line" 3SN and the "3σ line" 3SP two-dimensionally in the range surrounded by the "−3σ line" 3SN, peak line PKL, and the "+3σ line" 3SP.

With this, mask area renderer 19c displays image data IMG in which the heat map is rendered in the range surrounded by the "−3σ line" 3SN, peak line PKL, and the "+3σ line" 3SP on the display of monitor terminal 50 connected through network NW1 to thereby make it possible for the user to easily and visually recognize the frequency distribution indicating the detection rate of the person indicated by the heat map.

If the heat map is rendered on image data IMG and also the range surrounded by the "−3σ line"3SN, peak line PKL, and the"+3σ line" 3SP indicating the detection rate of the person is classified using colors capable of being identified and rendered, mask area renderer 19c may also render using a color classification method other than the heat map.

Mask area extractor 19d extracts the mask area, for which the face detection processing is excluded, among the entire area of image data IMG displayed on the display of monitor terminal 50 in pattern matching processor 21 using the output (information about the range of the frequency distribution generated for all virtual lines) of line statistical processor 19b and the output (for example, image data IMG in which the "−3σ line" 3SN, and the "+3σ line" 3SP are rendered) of mask area renderer 19c.

Specifically, mask area extractor 19d extracts an area obtained by excluding an area TPM surrounded by the lines (for example, the "−3σ line" 3SN and the "+3σ line" 3SP) indicating the boundary of the mask area rendered by mask area renderer 19c from face detection search area FBR as the mask area. Mask area extractor 19d correlates information indicating the range of the mask area with image data IMG to be saved in storage 15.

With this, mask area extractor 19d can determine the mask area in the present embodiment. Pattern matching processor 21 of the present embodiment performs the pattern matching processing for area TPM surrounded by the lines (for example, the "−3σ line"3SN and the"+3σ line" 3SP) indicating the boundary of the mask area rendered by mask area renderer 19c from face detection search area FBR.

Figure 8:
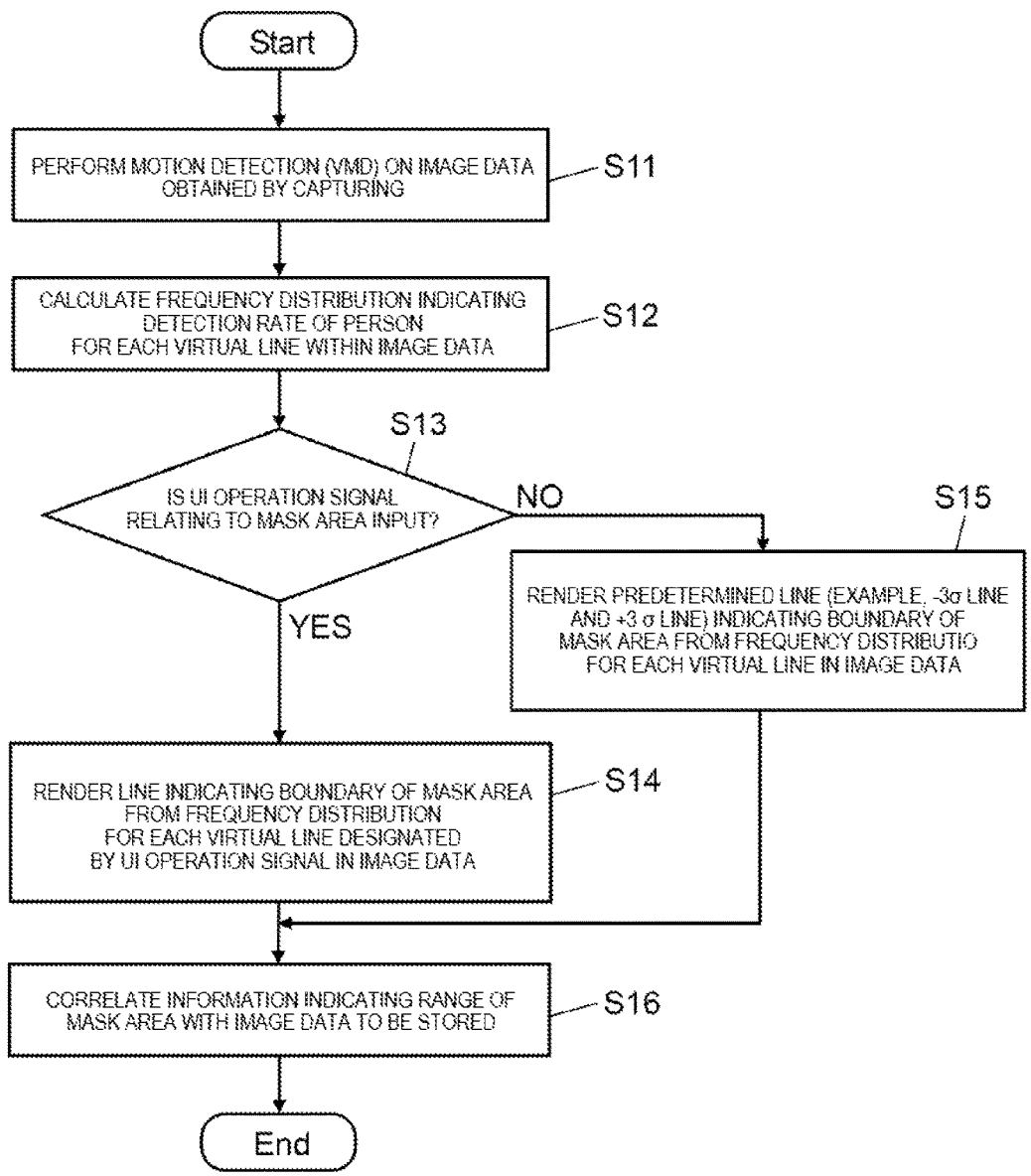
FIG. 8 is a flowchart for explaining an example of an operation procedure relating to mask area determination processing in a mask area determination unit of the image pickup device of the second exemplary embodiment in detail.

Next, the operations of mask area determination processing in mask area determination unit 19A of image pickup device 10A of the present embodiment will be described with reference to FIG. 8. FIG. 8 is a flowchart for explaining an example of an operation procedure relating to the mask area determination processing in mask area determination unit 19A of image pickup device 10A of the second exemplary embodiment in detail.

In FIG. 8, motion detector 19a reads image data captured by image pickup unit 11 from storage 15, performs the VMD processing over a certain period of time at each predetermined period, and detects the presence or absence of the motion of the target (for example, a person) in the image data (S11). Motion detector 19a outputs the processing result of the VMD processing to line statistical processor 19b.

Line statistical processor 19b sets a plurality of virtual lines shown in FIG. 5 in image data IMG captured by image pickup unit 11 using the output (processing result of the VMD processing) of motion detector 19a and calculates a frequency distribution indicating the detection rate of the person whose motion is detected for each virtual line (for example, virtual line Lk) and generates the frequency distribution (S12). The calculation processing of the frequency distribution of Step S12 is described in the above and thus, detailed description thereof will be omitted. Line statistical processor 19b outputs information about the range of the frequency distribution generated for all virtual lines which are set for image data IMG to mask area renderer 19c and mask area extractor 19d.

Here, in a case where the UI operation signal according to the change operation for changing the mask area by the user who operates monitor terminal 50 is input (S13, YES), mask area renderer 19c renders the lines (for example, the"−3σ line"3SN and the "+3σ line" 3SP) rendered on, image data IMG to be changed into lines indicating the boundary of the mask area corresponding to the value of the detection rate after the change (S14).

On the other hand, in a case where the UI operation signal according to the change operation for changing the mask area by the user who operates monitor terminal 50 is not input (S13, NO), mask area renderer 19c renders the predetermined lines (for example, the "−3σ line" 3SN and the "+3σ line" 3SP obtained by connecting the positions on image data IMG at which "peak value−3σ" and "peak value+3σ" are obtained) on image data IMG as the frequency distribution generated for all virtual lines which are set for image data IMG using the output (information about the range of the frequency distribution generated for all virtual lines) of line statistical processor 19b (S15).

After Step S14 or Step S15, mask area extractor 19d extracts the mask area for which the face detection processing is excluded among the entire area of image data IMG displayed on the display of monitor terminal 50 in pattern matching processor 21 using the output (for example, information about a range of the frequency distribution generated for all virtual lines) of line statistical processor 19b and the output (for example, image data IMG in which the −3σ line" 3SN and the "+3σ line" 3SP are rendered) of mask area renderer 19c.

Mask area extractor 19d correlates information indicating the range of the extracted mask area with the image data to be saved in storage 15 (S16). With this, the operations of mask area determination unit 19A shown in FIG. 8 are ended.

Figure 9:
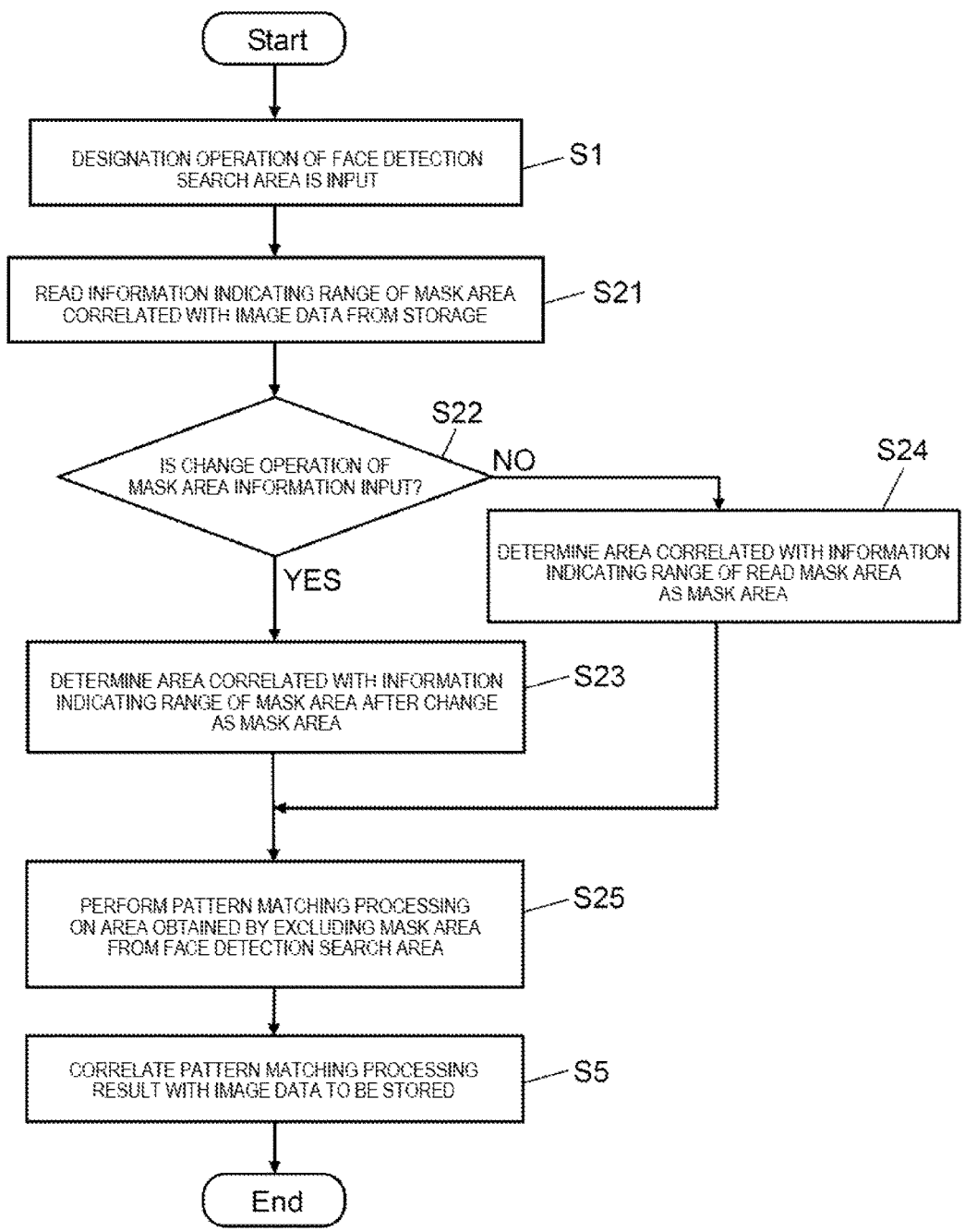
FIG. 9 is a flowchart for explaining an example of an operation procedure relating to the pattern matching processing of the image pickup device of the second exemplary embodiment in detail.

Next, the operations relating to the pattern matching processing of image pickup device 10A of the present embodiment will be described with reference to FIG. 9. FIG. 9 is a flowchart for explaining an example of an operation procedure relating to the pattern matching processing of image pickup device 10A of the second exemplary embodiment in detail. In the description shown in FIG. 9, the same reference numerals are given to the same contents as the operations of respective Steps shown in FIG. 3, descriptions there will be simplified or omitted, and different contents will be described.

In FIG. 9, after Step S1, mask area extractor 19d reads information indicating the range of the mask area correlated with image data IMG (S21). After Step S21, in a case where the UI operation signal according to the change operation for changing the mask area by the user who operates monitor terminal 50 is input (S22, YES), mask area extractor 19d extracts an area correlated with information indicating the range of the mask area after the change as the mask area (S23). With this, the mask area is determined by mask area determination unit 19A.

On the other hand, after Step S21, in a case where the UI operation signal according to the change operation for changing the mask area by the user who operates monitor terminal 50 is not input (S22, NO), mask area extractor 19d extracts an area correlated with information indicating the range of the mask area read in Step S21 as the mask area (S24). With this, the mask area is determined by mask area determination unit 19A.

After Step S23 or Step S24, pattern matching processor 21 performs the face detection processing for face detection target area TPM obtained by excluding the mask area determined in Step S23 or Step S24 from face detection search area FBR designated among the imaged image data (that is, image data displayed on the display of monitor terminal 50) (S25). Processing from Step S25 and subsequent Steps (specifically, the operation of Step S5) is the same as the operation of Step S5 shown in FIG. 3 and thus, descriptions thereof will be omitted.

Thus, image pickup device 10A of the present embodiment generates the frequency distribution indicating the detection rate on the virtual line of the target (for example, the person) of which the motion is detected by motion detector 19a for each of the plurality of virtual lines which are set for the entire area of the image data. Image pickup device 10A extracts the mask area from a portion or the entirety of the area of the image data based on the frequency distribution generated for each of the plurality of virtual lines.

With this, image pickup device 10A can obtain an area in which the motion of the target (for example, the person) is detected to be statistically precise among an area of a portion or the entirety of an area of image data IMG obtained by imaging as the frequency distribution and furthermore, determine an area other than the area specified by the frequency distribution for each of the virtual lines which are set in image data IMG as the mask area so as to make it possible to narrow the target range of the face detection processing with high accuracy without necessitating the input operation through the UI by the user. Image pickup device 10A does not perform the face detection processing for the entire area of image data IMG unlike the conventional technique and thus, can perform the face detection processing of the image data at a relatively high speed in that the face detection processing of the mask area can be omitted.

Third Exemplary Embodiment

In the third exemplary embodiment, mask area determination unit 19B of image pickup device 10B extracts a mask area from the area of a predetermined shape (for example, the rectangular shape) including the target (for example, the person), of which the motion is detected, among the imaged image data IMG and determines the mask area.

In the description of image pickup device 10B of the third exemplary embodiment, descriptions of the same configuration and constitutional elements of operations of the image pickup devices 10 and 10A of the first and second exemplary embodiments will be simplified or omitted, and different contents will be described.

Figure 10:
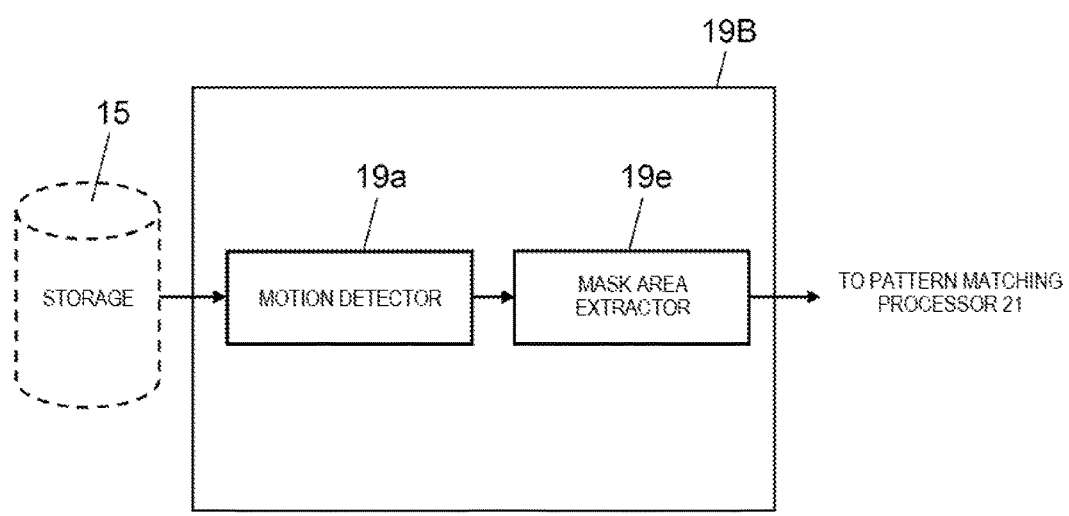
FIG. 10 is a block diagram illustrating an example of an internal configuration of a mask area determination unit of an image pickup device of a third exemplary embodiment in detail.

FIG. 10 is a block diagram illustrating an example of an internal configuration of mask area determination unit 19B of image pickup device 10B of a third exemplary embodiment in detail. Mask area determination unit 19B shown in FIG. 10 is configured to include motion detector 19a and mask area extractor 10e. Each component of mask area determination unit 19B is configured using, for example, the CPU, the MPU, the DSP or the FPGA.

Figure 11:
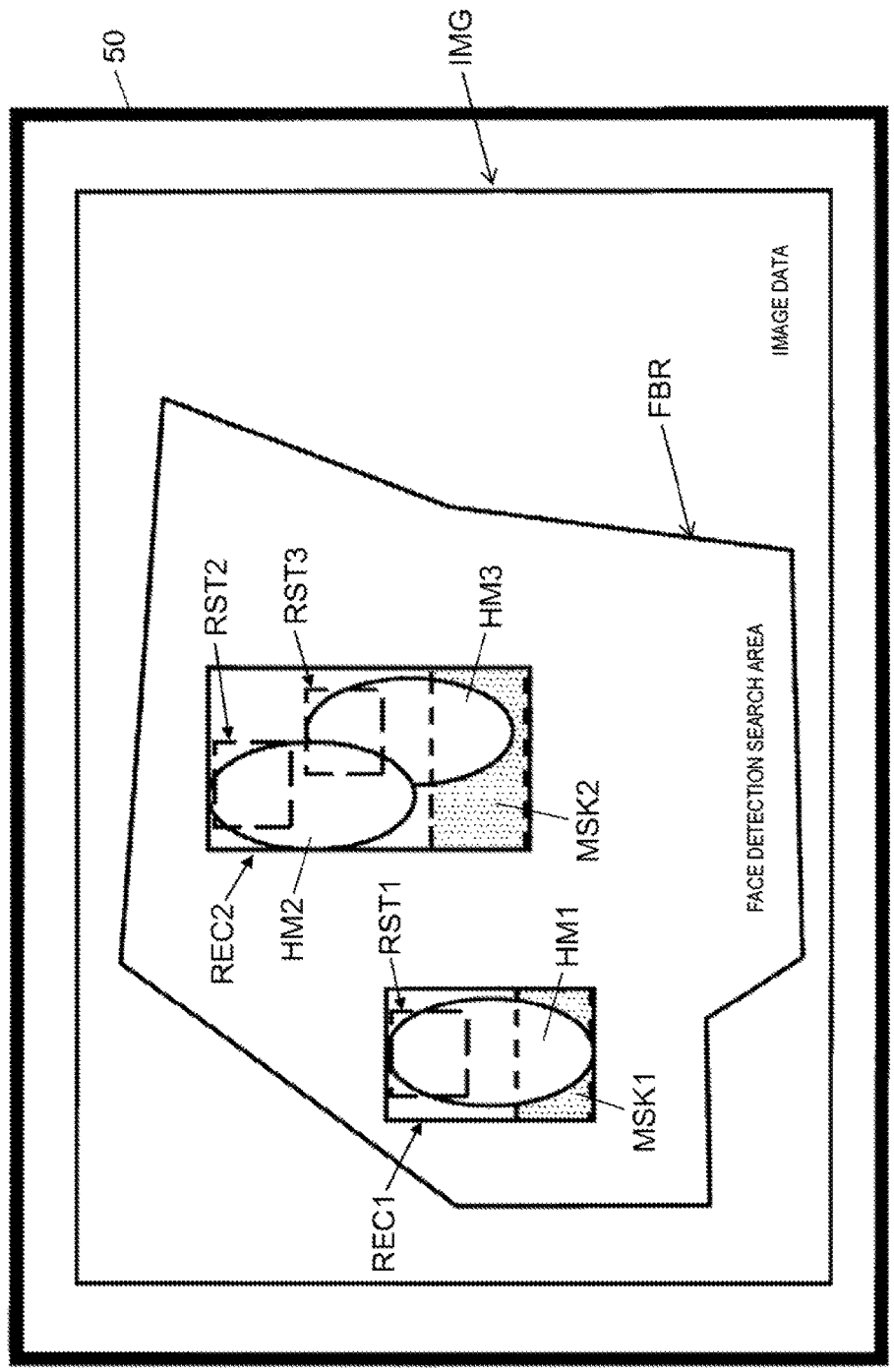
FIG. 11 is an explanatory diagram of a face detection target area which becomes a target of the pattern matching processing in the third exemplary embodiment.

The operations of motion detector 19a are the same as the operations of motion detector 19a shown in FIG. 4 and thus, detailed description thereof will be omitted. FIG. 11 is an explanatory diagram of a face detection target area which becomes a target of pattern matching processing in the third exemplary embodiment. Motion detector 19a extracts, as the result of the VMD processing for the entire area or face detection search area FBR of image data IMG, rectangular shaped area REC1 including a single target (for example, person HM1) of which the motion is detected, and further extracts rectangular shaped area REC2 including a plurality of targets (for example, persons HM2 and HM3) of which the motion is detected. Motion detector 19a outputs the processing result (information about the ranges of rectangular shapes REC1 and REC2 and information about the ranges of persons HM1, HM2 and HM3) of the VMD processing to mask area extractor 19e.

Mask area extractor 19e extracts an area obtained by excluding an area of a predetermined rate of an upper portion among the area, which includes person HM1 of which the motion is detected by motion detector 19a, of rectangular shaped area REC1 using the output (processing result of the VMD processing) of motion detector 19a as mask area MSK1. The area of the predetermined rate of the upper portion is, for example, an area occupying the area of a predetermined rate (for example, 60%) of rectangular shaped area REC1 in an upper area having a high possibility that the face of person HM1 is detected, among rectangular shaped area REC1 including person HM1.

In a case where the motion of a plurality of persons is detected by motion detector 19a, mask area extractor 19e may also change the value of a predetermined rate of an upper portion to extract mask area MSK2 according to the area of rectangular shaped area REC2 including a plurality (for example, 2 persons) of persons HM2 and HM3. Mask area extractor 19e, for example, changes a value of the predetermined rate of the upper portion from 60% to 70% to extract mask area MSK2 according to the area of rectangular shaped area REC2 including a plurality (for example, 2 persons) of persons HM2 and HM3. Mask area extractor 19e correlates information indicating the range of mask areas MSK1 and MSK2 with image data IMG to be saved in storage 15.

Mask area determination unit 19B of the present embodiment may also extract and determine mask areas MSK1 and MSK2 by being combined with the configuration of mask area determination unit 19A of the second exemplary embodiment (see FIG. 12). FIG. 12 is an explanatory diagram of a face detection target area which becomes a target of the pattern matching processing in a case where the second and third exemplary embodiments are combined.

In this case, mask area extractor 19e extracts the area obtained by excluding the area of the predetermined rate of the upper portion of rectangular shapes REC1 and REC2 including persons HM1, HM2, and HM3, whose motion is detected, as mask areas MSK1 and MSK2 not in the entire area of image data IMG but in area TPM shown in FIG. 5. With this, mask area extractor 19e can easily extract the mask area within face detection search area FBR among image data IMG after taking into consideration the detection rate of the person.

Figure 13A:
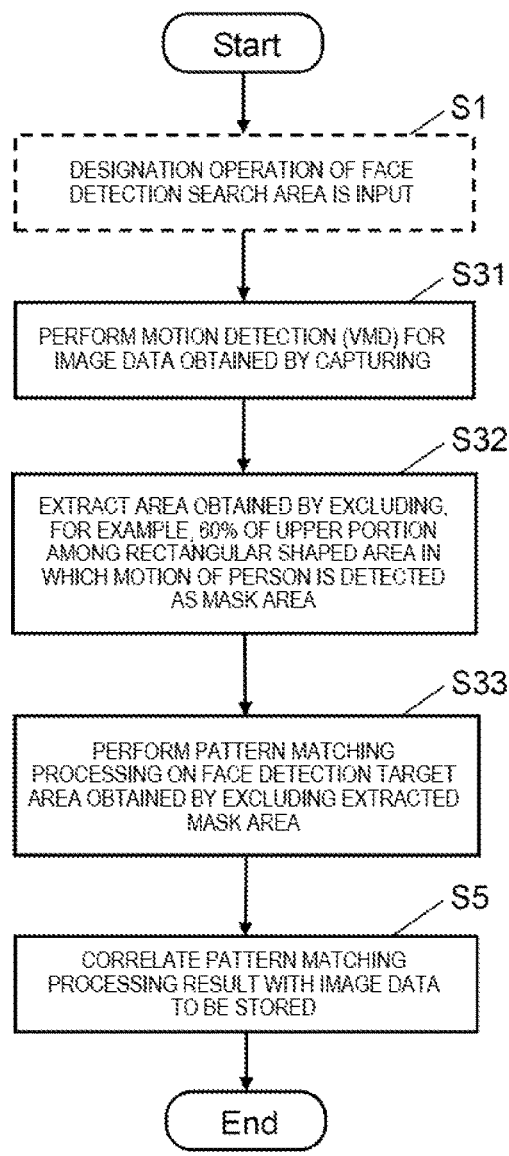
FIG. 13A is a flowchart for explaining a first example of an operation procedure relating to the pattern matching processing of the image pickup device of the third exemplary embodiment in detail.
Figure 13B:
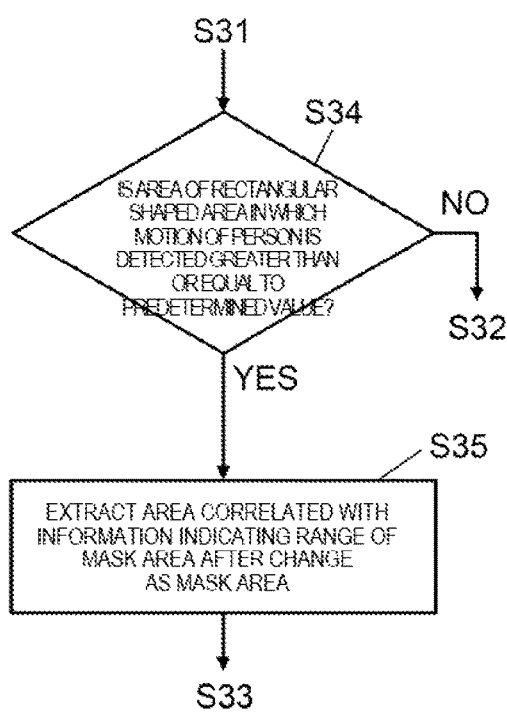
FIG. 13B is a flowchart for explaining a second example of the operation procedure relating to the pattern matching processing of the image pickup device of the third exemplary embodiment in detail.

Next, the operations of the determination processing and the pattern matching processing of the mask area of image pickup device 10B of the present embodiment will be described with reference to FIG. 13A and FIG. 13B. FIG. 13A is a flowchart for explaining a first example of an operation procedure relating to the pattern matching processing of the image pickup device of the third exemplary embodiment in detail. FIG. 13B is a flowchart for explaining a second example of the operation procedure relating to the pattern matching processing of the image pickup device of the third exemplary embodiment in detail.

In FIG. 13A, operations for a case where rectangular shaped area REC1 including person HM1 shown in FIG. 11 is detected by motion detector 19a are represented. In FIG. 13B, operations for a case where rectangular shaped area REC2 including persons HM2 and HM3 shown in FIG. 11 is detected by motion detector 19a are represented. In the description represented in FIG. 13A and FIG. 13B, the same reference numerals are given to the same contents as the operations of respective Steps shown in FIG. 3 or FIG. 13A, descriptions of thereof are simplified or omitted, and different contents will be described.

In FIG. 13A, after Step S1, motion detector 19a reads the image data captured by image pickup unit 11 from storage 15, performs the VMD processing over a certain period of time at each predetermined period, and detects the presence or absence of the motion of the target (for example, a person) in the image data (S31).

Motion detector 19a extracts, as the result of the VMD processing for the entire area or face detection search area FBR of image data IMG, rectangular shaped area REC1 including a single target (for example, person HM1) of which the motion is detected, and further extracts rectangular shaped area REC2 including a plurality of targets (for example, persons HM2 and HM3) of which the motion is detected. Motion detector 19a outputs the processing result (information about the ranges of rectangular shapes REC1 and REC2 and information about the ranges of persons HM1, HM2, and HM3) of the VMD processing to mask area extractor 19e. In FIG. 13A, the operation of Step S1 may also be omitted.

Mask area extractor 19e extracts an area obtained by excluding an area of a predetermined rate of an upper portion (for example, 60%) among the area of rectangular shaped area REC1, which includes person HM1 of which the motion is detected by motion detector 19a, using the output (processing result of the VMD processing) of motion detector 19a as mask area MSK1 (S32). With this, the mask area is determined by mask area determination unit 19B. Mask area extractor 19e correlates information indicating the range of mask area MSK1 with image data IMG to be saved in storage 15.

Pattern matching processor 21 performs the face detection processing for the face detection target area obtained by excluding the mask area determined in Step S32 from the rectangular shape extracted in Step S31 in the designated face detection search area FBR in the imaged image data (that is, image data displayed on the display of monitor terminal 50) (S33). In a case where a plurality of rectangular shapes are extracted, pattern matching processor 21 performs sequentially the face detection processing for the face detection target areas obtained by excluding the mask area from each area of the rectangular shape. Processing from Step S33 and subsequent Steps (specifically, the operation of Step S5) is the same as the operation of Step S5 shown in FIG. 3 and thus, descriptions thereof will be omitted.

In FIG. 13B, after Step S31, in a case where an area of the rectangular shape extracted in Step S31 is greater than or equal to a predetermined value (S34, YES), mask area extractor 19e, for example, changes the value of the predetermined rate of the upper portion from 60% to 70%, and extracts an area correlated with information indicating a range of the mask area after the change as a mask area (S35). With this, the mask area is determined by mask area determination unit 19B. Processing from Step S35 and subsequent Steps is the same as the operations of Step S33 and subsequent Steps shown in FIG. 13A and thus, descriptions thereof will be omitted.

Thus, image pickup device 10B of the present embodiment extracts an area obtained by excluding the area of the predetermined rate of the upper portion of the area of rectangular shaped area REC1 including the area in which the motion of the target (for example, person HM1) is detected in a portion or the entirety of the area of image data IMG obtained by imaging as mask area MSK1. It is considered that the area in which the face of persons HM1, HM2, and HM3 is detected is often the upper portion of rectangular shapes REC1 and REC2.

With this, image pickup device 10B can easily extract mask area MSK1 for which the face detection processing is omissible in the area of rectangular shaped area REC1 in which the motion of person HM1 is detected for a portion or the entirety of the area of image data IMG and perform the face detection processing at a relatively higher speed than a case where the face detection processing is performed for the entire area of the image data in the conventional technique.

In a case where the motion of the plurality of persons HM2 and HM3 is detected, image pickup device 10B changes the predetermined rate of the upper portion and extracts mask area MSK2 according to an area (size) of the area of rectangular shaped area REC2 including the plurality of persons HM2 and HM3 so as to make it possible to comprehensively detect the faces of a plurality of persons.

Hereinafter, the configuration, action, and effect of the image pickup device and the characteristic part detection method according to the present invention described above will be described.

An exemplary embodiment of the present invention is an image pickup device which includes an image pickup unit that captures a video image, a mask area determination unit that determines a mask area, for which processing for detection of a characteristic part of a target is excluded, among a portion or the entirety of an area of image data of the video image captured by the image pickup unit, and a characteristic part detector that performs the detection processing of the characteristic part of the target on a detection target area obtained by excluding the mask area determined by the mask area determination unit from the portion or the entirety of the area of the image data of the video image captured by the image pickup unit.

In this configuration, the mask area determination unit determines the mask area for which the detection processing of the characteristic part of the target is excluded among the portion or the entirety of the area of the image data of the video image captured by the image pickup unit. The characteristic part detector performs the detection processing of the characteristic part of the target on the area obtained by excluding the mask area from the portion or the entirety of the area of the image data.

With this, the image pickup device can extract the mask area for which the detection processing of the characteristic part (for example, a face) of the target from the image data and perform the face detection processing by excluding the mask area from the entire area of the image data so as to make it possible to perform the face detection processing at a high speed without regarding the entire area of the image data obtained by imaging as a target of the detection processing.

An exemplary embodiment of the present invention is the image pickup device in which the mask area determination unit determines the area designated according to a predetermined input operation as the mask area.

According to the configuration, the image pickup device determines an area designated by a predetermined input operation (for example, an input operation through UI (user interface) of a user) as the mask area and thus, the image pickup device can easily narrow a target range of the face detection processing after taking into consideration the situation of the user.

An exemplary embodiment of the present invention is the image pickup device in which the mask area determination unit includes a motion detector detecting the motion of the target in a portion or the entirety of the area of the image data of the video image captured by the image pickup unit, a line statistical processor generating a frequency distribution indicating a detection rate on a virtual line of the target of which the motion is detected by the motion detector for each of a plurality of virtual lines which are set for the entire area of the image data, and a mask area extractor extracting the mask area from the portion or the entirety of the area of the image data based on the frequency distribution for each of the plurality of virtual lines generated by the line statistical processor.

In this configuration, the line statistical processor generates the frequency distribution indicating the detection rate on the virtual line of the target of which the motion is detected by the motion detector for each of the plurality of virtual lines which are set for the entire area of the image data. The mask area extractor extracts a mask area from a portion or the entirety of an area of the image data based on the frequency distribution generated for each of the plurality of virtual lines.

With this, the image pickup device can obtain an area in which the motion of the target (for example, the person) is detected to be statistically precise in an area of a portion or the entirety of an area of the image data obtained by imaging as the frequency distribution and furthermore, determine an area other than the area specified by the frequency distribution for each virtual line which are set in the image data as the mask area so as to make it possible for a user to narrow the target range of the face detection processing with high accurate without necessitating the input operation through the UI of the user. The image pickup device does not perform the face detection processing on the entire area of the image data unlike in the conventional technique and thus, the image pickup device can perform the face detection processing of the image data at a relatively high speed in that the face detection processing of the mask area can be omitted.

An exemplary embodiment of the present invention is the image pickup device in which the mask area determination unit further includes a mask area renderer rendering the frequency distribution for each of the plurality of virtual lines generated by the line statistical processor in the image data.

According to this configuration, the image pickup device can render the frequency distribution indicating the detection rate of the person generated for each of the plurality of virtual lines in the image data and display, for example, the rendered image data on an external device connected through the network to thereby make it possible to explicitly indicate an area which becomes a candidate for the mask area to the user.

An exemplary embodiment of the present invention is the image pickup device in which the mask area renderer renders the mask area rendered according to the frequency distribution for each of the plurality of virtual lines according to the detection rate on the virtual line of the target designated by a predetermined change operation.

According to this configuration, the image pickup device changes the detection rate on the virtual line of the target designated by the predetermined change operation (for example, change operation through the UI of a user) and thus, the image pickup device can easily change a target range of the face detection processing after taking into consideration the condition of the user, for example, further narrowing the area in which motion of the target (for example, a person) is detected to be statistically precise.

An exemplary embodiment of the present invention is the image pickup device in which the line statistical processor increments the frequency indicating the detection rate of the target in an intersecting point position of a motion vector of a center of gravity of the area of a predetermined shape including the target of which the motion is detected by the target detector and the virtual line and generates the frequency distribution.

In this configuration, the image pickup device increments the frequency indicating the detection rate of the target in the intersecting point position of the motion vector (for example, a motion vector configured by the center of gravity of the rectangular area in the image data before 1 frame processing and the center of gravity of the rectangular area in the image data of the current frame) of the center of gravity of the area of a predetermined shape (for example, the rectangular shape) including the target (for example, the person), of which the motion is detected, and the virtual line.

With this, the image pickup device can accurately and three-dimensionally obtain the frequency indicating the detection rate of a moving site (position) of the person of the image data detected by the VMD processing.

An exemplary embodiment of the present invention is the image pickup device in which the line statistical processor increments the frequency indicating the detection rate of the target in intersecting point position of the virtual line close to the center of gravity of the area of the predetermined shape including the target of which the motion is detected by the target detector and the predetermined shape and generates the frequency distribution.

In this configuration, the image pickup device increments the frequency indicating the detection rate of the target in intersecting point position of the virtual line close to the center of gravity of the area of the predetermined shape (for example, the rectangular shape) including the target (for example, the person) of which the motion is detected and the rectangular area.

With this, the image pickup device can accurately and three-dimensionally obtain the frequency distribution indicating the detection rate of the moving site (area) of the person of image data IMG detected by the VMD processing.

An exemplary embodiment of the present invention is the image pickup device in which the line statistical processor increments the frequency indicating the detection rate of the target in intersecting point position of the motion vector of the center of gravity of the area of the predetermined shape including the target detected by the target detector and the virtual line and generates the frequency distribution.

In this configuration, the image pickup device increments the frequency indicating the detection rate of the target in the intersecting point position of the motion vector (for example, a motion vector configured by the center of gravity of the rectangular area in the image data before 1 frame processing and the center of gravity of the rectangular area in the image data of the current frame) of the center of gravity of the area of the predetermined shape (for example, the rectangular shape) including the detected target (for example, the person) and the virtual line.

With this, the image pickup device can accurately and three-dimensionally obtain the frequency indicating the detection rate of the moving site (position) of the person of image data IMG detected by the person detection processing.

An exemplary embodiment of the present invention is the image pickup device in which the line statistical processor increments the frequency indicating the detection rate of the target in the intersecting point position of the virtual line close to the center of gravity of the area of the predetermined shape including the target detected by the target detector and the predetermined shape and generates the frequency distribution.

In this configuration, the image pickup device increments the frequency indicating the detection rate of the target in intersecting point position of the virtual line close to the gravity of the center of the area of the predetermined shape (for example, the rectangular shape) including the detected target (for example, the person) and the rectangular area.

With this, the image pickup device can three-dimensionally obtain the frequency distribution indicating the detection rate of the moving site (area) of the person of image data IMG detected by the person detection processing and furthermore, the frequency of a site where the person often stays is high and thus, the image pickup device can obtain the frequency distribution for extracting the mask area such that the face detection processing is performed by being narrowed to the position where the person often stays.

An exemplary embodiment of the present invention is the image pickup device in which the mask area renderer renders a plurality of normal distribution curves, which indicate the frequency distribution for each of the plurality of virtual lines generated by the line statistical processor, in the image data to be displayed on the display unit.

According to this configuration, the image pickup device can display image data IMG in which the plurality of normal distribution curves are rendered on the display of the monitor terminal connected through a network so as to make it possible for the user to easily and visually recognize the frequency distribution curve indicating the detection rate of the person generated for each of some or the plurality of virtual lines.

An exemplary embodiment of the present invention is the image pickup device in which the mask area renderer renders the frequency distribution indicating the detection rate of the target detected by the target detector to be classified and identified using colors using the frequency distribution for each of the plurality of virtual lines generated by the line statistical processor and displays the frequency distribution on the display unit.

According to this configuration, the image pickup device, for example, displays the image data (for example, the image data in which the heat map is rendered), which is rendered by being classified into the range surrounded by the "−3σ line", the "peak line", and the "+3σ line" obtained by connecting the "−3σ", "peak value", and the "+3σ" for each of the plurality of virtual lines, to be identified using colors on the display of the monitor terminal connected through the network so as to make it possible for the user to easily and visually recognize the frequency distribution indicating the detection rate of the person indicated by the heat map.

An exemplary embodiment of the present invention is the image pickup device in which the line statistical processor displays the frequency distribution for each of the plurality of virtual lines generated using the result of the motion detection processing of the target in the target detector on the display unit.

According to this configuration, the image pickup device displays the image data including the result of the frequency distribution indicating the detection rate of the person for each of a plurality of virtual lines generated using the VMD processing result of the target (for example, a person) on the display of the monitor terminal connected through the network to thereby make it possible for the user to easily and visually recognize the result (see, for example, a normal distribution curve, or a bar graph, a line graph, the heat map which will be described later) of the frequency distribution indicating the detection rate of the person generated for each of some or a plurality of virtual lines.

An exemplary embodiment of the present invention is the image pickup device in which the line statistical processor displays the frequency distribution for each of the plurality of virtual lines generated in the target detector using the result of the detection processing of the target on the display unit.

According to this configuration, the image pickup device displays the image data including the result of the frequency distribution indicating the detection rate of the person for each of a plurality of virtual lines generated using the detection processing result of the target (for example, the person) on the display of the monitor terminal connected through the network to thereby make it possible for the user to easily and visually recognize the result (see, for example, the normal distribution curve, or a normal distribution curve, or a bar graph, a line graph, the heat map which will be described later) of the frequency distribution indicating the detection rate of the person generated for each of some or a plurality of virtual lines.

An exemplary embodiment of the present invention is the image pickup device in which the mask area determination unit includes the motion detector that detects the motion of the target in a portion or the entirety of the area of the image data of the video image captured by the image pickup unit, the mask area extractor that extracts the area obtained by excluding the area of the predetermined rate of the upper portion among the area of the predetermined shape including the target of which the motion is detected by the motion detector as the mask area.

In this configuration, the image pickup device extracts the area obtained by excluding the area of the predetermined rate of the upper portion among the area of the predetermined shape including the area in which the motion of the target (for example, the person) is detected in the portion or the entirety of the area of the image data obtained by imaging as the mask area. It is considered that the area in which the face of the person is detected is often the upper portion of the predetermined shape.

With this, the image pickup device can easily extract the mask area for which the face detection processing is omissible in the area of the predetermined shape (for example, the rectangular shape) in which the motion of the person is detected for the portion or the entirety of the area of the image data and perform the face detection processing at a relatively higher speed than a case where the face detection processing is performed on the entire area of the image data in the conventional technique.

An exemplary embodiment of the present invention is the image pickup device in which the mask area extractor changes the predetermined rate of the upper portion and extracts the mask area according to an area of the predetermined shape including a plurality of targets in a case where the motion of the plurality of targets is detected by the motion detector.

According to this configuration, in a case where the motion of the plurality of targets (for example, the person) is detected, the image pickup device changes the predetermined rate of the upper portion and extracts the mask area according to the area (size) of the area of the predetermined shape (for example, the rectangular shape) including a plurality of persons and thus, the image pickup device can comprehensively detect the faces of a plurality of persons.

An exemplary embodiment of the present invention is a characteristic part detection method in the image pickup device which includes a step of imaging a video image, a step of determining a mask area, for which processing for detection of a characteristic part of a target is excluded, among a portion or the entirety of an area of image data of the imaged video image, and a step of performing the detection processing of the characteristic part of the target on a detection target area obtained by excluding the determined mask area from the portion or the entirety of the area of the image data of the imaged video image.

According to this method, a mask area determination unit determines the mask area, for which processing for detection of a characteristic part of a target is excluded, among a portion or the entirety of an area of image data of a video image captured by an image pickup unit. A characteristic part detector performs the detection processing of the characteristic part of the target on an area obtained by excluding the mask area from the portion or the entirety of the area of the image data.

With this, the image pickup device can extract the mask area for which the detection processing of the characteristic part (for example, the face) of the target is omissible among the image data and exclude the mask area from the entire area of the image data, perform the face detection processing and thus, the image pickup device can perform the face detection processing at a higher speed without regarding the entire area of the image data obtained by imaging as a target for the detection processing.

Thus, although various exemplary embodiments have been described with reference to drawings, it is needless to say that the present invention is not limited to such examples. It is apparent that a person skilled in the art is able to arrive various alteration examples and modification examples in a scope described in claims and it is understood that these alteration examples and modification examples are naturally fallen within a technical scope of the present invention.

In mask area determination units 19A and 19B of the second and third exemplary embodiments, motion detector 19a is provided at a forestage of line statistical processor 19b and mask area extractor 19e, the VMD processing result in motion detector 19a is input to line statistical processor 19b and mask area extractor 19e. However, in line statistical processor 19b and mask area extractor 19e are not limited to the VMD processing result in motion detector 19a.

For example, motion detector 19a, instead of the VMD processing, may also perform the person detection processing using the pattern matching processing which learns a shape of a person each time when the person is detected. In a case where image pickup devices 10A and 10B are provided in a moving object (for example, a railroad, an airplane, a bus, a ship, an automobile, a bike, a bicycle), motion detector 19a may also perform the object detection processing using an optical flow.

INDUSTRIAL APPLICABILITY

The present invention is used as an image pickup device and a characteristic part detection method capable of extracting a mask area, for which face detection processing can be omitted, from image data to implement increase in processing speed of the face detection processing without regarding an entire area of an image data as a target.

REFERENCE MARKS IN THE DRAWINGS 10,10A,10B: image pickup device
11: image pickup unit
13: signal processor
15: storage
17: face detection search area determination unit
19,19A,19B: mask area determination unit
19a: motion detector
19b: line statistical processor
19c: mask area renderer
19d,19e: mask area extractor
21: pattern matching processor
23: image compressor
25: image transmitter
50: monitor terminal

The invention claimed is:

1. An image pickup device comprising:
an image pickup unit, which, in operation, captures a video image;
a mask area determination unit, which, in operation, determines a mask area, for which processing for detection of a characteristic part of a target is excluded, among a portion or entirety of an area of image data of the video image captured by the image pickup unit; and
a characteristic part detector, which, in operation, performs processing for detection of the characteristic part of the target on a detection target area obtained by excluding the mask area determined by the mask area determination unit from the portion or the entirety of the area of the image data of the video image captured by the image pickup unit,
the mask area determination unit including:
a target detector, which, in operation, detects the target in a portion or the entirety of the area of the image data of the video image captured by the image pickup unit,
a line statistical processor, which, in operation, generates a frequency distribution indicating a detection rate on a virtual line of the target detected by the target detector for each of a plurality of virtual lines which are set for the entire area of the image data, and
a mask area extractor, which, in operation, extracts the mask area from the portion or the entirety of the area of the image data based on the frequency distribution for each of the plurality of virtual lines generated by the line statistical processor.

2. The image pickup device of claim 1,
wherein the mask area determination unit further includes a mask area renderer, which, in operation, renders the frequency distribution for each of the plurality of virtual lines generated by the line statistical processor in the image data.

3. The image pickup device of claim 2,
wherein the mask area renderer renders the mask area rendered according to the frequency distribution for each of the plurality of virtual lines according to the detection rate on the virtual line of the target designated by a predetermined change operation.

4. The image pickup device of claim 2,
wherein the mask area renderer renders a plurality of normal distribution curves indicating the frequency distribution for each of the plurality of virtual lines generated by the line statistical processor in the image data and displays the normal distribution curves on a display unit.

5. The image pickup device of claim 2,
wherein the mask area renderer renders the frequency distribution indicating the detection rate of the target detected by the target detector to be classified and identified using colors using the frequency distribution for each of the plurality of virtual lines generated by the line statistical processor and displays the frequency distribution on the display unit.

6. The image pickup device of claim 1,
wherein the line statistical processor increments a frequency indicating the detection rate of the target in an intersecting point position of a motion vector of a center of gravity of the area of a predetermined shape including the target of which the motion is detected by the target detector and the virtual line and generates the frequency distribution.

7. The image pickup device of claim 1,
wherein the line statistical processor increments a frequency indicating the detection rate of the target in an intersecting point position of the virtual line close to a center of gravity of an area of a predetermined shape including the target of which the motion is detected by the target detector and the predetermined shape and generates the frequency distribution.

8. The image pickup device of claim 1,
wherein the line statistical processor increments a frequency indicating the detection rate of the target in an intersecting point position of a motion vector of a center of gravity of an area of a predetermined shape including the target detected by the target detector and the virtual line and generates the frequency distribution.

9. The image pickup device of claim 1,
wherein the line statistical processor increments a frequency indicating the detection rate of the target in an intersecting point position of the virtual line close to a center of gravity of an area of a predetermined shape including the target detected by the target detector and the predetermined shape and generates the frequency distribution.

10. The image pickup device of claim 1,
wherein the line statistical processor displays the frequency distribution for each of the plurality of virtual lines generated using the result of the motion detection processing of the target in the target detector on the display unit.

11. The image pickup device of claim 1,
wherein the line statistical processor displays the frequency distribution for each of the plurality of virtual lines generated using the result of the detection processing of the target in the target detector on the display unit.

12. A characteristic part detection method comprising:
capturing a video image;
determining a mask area, for which processing for detection of a characteristic part of a target is excluded, among a portion or entirety of an area of image data of the captured video image;
detecting the target in the portion or entirety of the area of the image data of the captured video image;
generating a frequency distribution indicating a detection rate on a virtual line of the detected target for each of a plurality of virtual lines which are set for the entire area of image data;
extracting the mask area from the portion or entirety of the area of the image data based on the frequency distribution for each of the generated plurality of virtual lines;
performing processing for detection of the characteristic part of the target on a detection target area obtained by excluding the determined mask area from the portion or entirety of the area of the image data of the captured video image.

\* \* \* \* \*